United States Patent
Yang et al.

(10) Patent No.: US 11,569,971 B2
(45) Date of Patent: Jan. 31, 2023

(54) ELECTRONIC DEVICE COMPRISING DIPLEXER CAPABLE OF ADJUSTING CUTOFF FREQUENCY IN CONNECTION WITH ADJUSTMENT OF RECEPTION FREQUENCY BAND OF DUPLEXER

(71) Applicant: Samsung Electronics Co., Ltd., Gyeonggi-do (KR)

(72) Inventors: Dongil Yang, Gyeonggi-do (KR); Hanyeop Lee, Gyeonggi-do (KR); Hyoseok Na, Gyeonggi-do (KR)

(73) Assignee: Samsung Electronics Co., Ltd.

( * ) Notice: Subject to any disclaimer, the term of this patent is extended or adjusted under 35 U.S.C. 154(b) by 29 days.

(21) Appl. No.: 16/977,709

(22) PCT Filed: Apr. 15, 2019

(86) PCT No.: PCT/KR2019/004510
§ 371 (c)(1),
(2) Date: Sep. 2, 2020

(87) PCT Pub. No.: WO2019/203518
PCT Pub. Date: Oct. 24, 2019

(65) Prior Publication Data
US 2021/0058220 A1    Feb. 25, 2021

(30) Foreign Application Priority Data
Apr. 17, 2018   (KR) .................. 10-2018-0044192

(51) Int. Cl.
*H04L 5/14* (2006.01)
*H04B 1/48* (2006.01)

(52) U.S. Cl.
CPC ........ *H04L 5/14* (2013.01); *H04B 1/48* (2013.01)

(58) Field of Classification Search
CPC ...... H04L 5/14; H04B 1/48; H04B 1/52; H04B 1/0458; H04B 1/18; H04B 1/0057
See application file for complete search history.

(56) References Cited

U.S. PATENT DOCUMENTS

| 7,676,244 B2 | 3/2010 | Park et al. |
| 9,838,046 B2 | 12/2017 | Lum et al. |

(Continued)

FOREIGN PATENT DOCUMENTS

| KR | 1020070021006 | 2/2007 |
| KR | 1020130010104 | 1/2013 |

(Continued)

OTHER PUBLICATIONS

Korean Office Action dated Feb. 16, 2022 issued in counterpart application No. 10-2018-0044192, 4 pages.

(Continued)

*Primary Examiner* — Kibrom T Hailu
*Assistant Examiner* — Nizam U Ahmed
(74) *Attorney, Agent, or Firm* — The Farrell Law Firm, P.C.

(57) ABSTRACT

Disclosed is an electronic device including an antenna module including one or more antennas transmitting or receiving a signal in a first frequency band and a second frequency band wirelessly, a first duplexer separating the first frequency band into a first transmission frequency band and a first reception frequency band and adjusting the first reception frequency band, a second duplexer separating the second frequency band into a second transmission frequency band and a second reception frequency band and adjusting the second reception frequency band, and a diplexer including a first terminal electrically connected to the antenna module, a first filter passing the first frequency band, a second terminal electrically connected to the first filter and (Continued)

the first duplexer, a second filter passing the second frequency band, and a third terminal electrically connected to the second filter and the second duplexer. The diplexer adjusts a cut-off frequency of the first filter or the second filter in connection with the first reception frequency band adjusted through the first duplexer or the second reception frequency band adjusted through the second duplexer. In addition, various embodiments as understood from the specification are also possible.

15 Claims, 15 Drawing Sheets

(56) References Cited

U.S. PATENT DOCUMENTS

| | | | |
|---|---|---|---|
| 9,838,069 | B2 | 12/2017 | Emmanuel |
| 2004/0209590 | A1* | 10/2004 | Forrester ............... H04B 1/52 |
| | | | 455/324 |
| 2009/0286501 | A1 | 11/2009 | Rousu et al. |
| 2013/0016633 | A1 | 1/2013 | Lum et al. |
| 2015/0085708 | A1 | 3/2015 | Khlat |
| 2015/0085724 | A1 | 3/2015 | Khlat |
| 2015/0087246 | A1 | 3/2015 | Khlat |
| 2018/0019729 | A1* | 1/2018 | Tsukamoto ............ H04B 1/006 |
| 2018/0062694 | A1 | 3/2018 | Emmanuel |

FOREIGN PATENT DOCUMENTS

| | | |
|---|---|---|
| KR | 1020170018773 | 2/2017 |
| KR | 1020170104238 | 9/2017 |

OTHER PUBLICATIONS

PCT/ISA/210 Search Report issued on PCT/KR2019/004510, dated Aug. 7, 2019, pp. 5.

PCT/ISA/237 Written Opinion issued on PCT/KR2019/004510, dated Aug. 7, 2019, pp. 5.

* cited by examiner

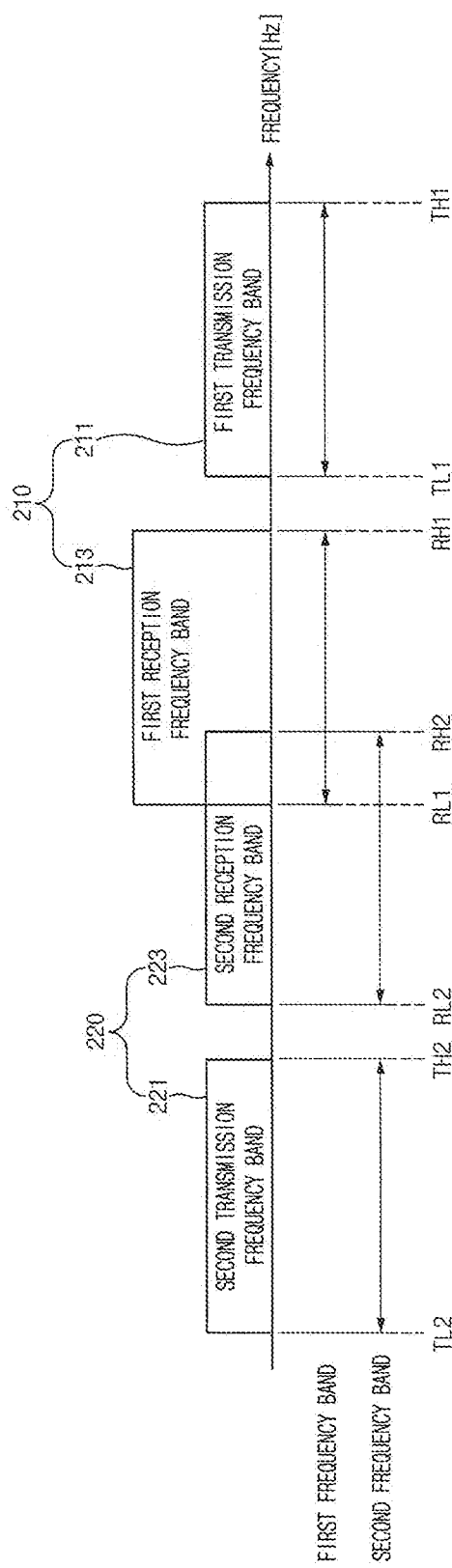
F I G. 2

ELECTRONIC DEVICE COMPRISING DIPLEXER CAPABLE OF ADJUSTING CUTOFF FREQUENCY IN CONNECTION WITH ADJUSTMENT OF RECEPTION FREQUENCY BAND OF DUPLEXER

PRIORITY

This application is a National Phase Entry of PCT International Application No. PCT/KR2019/004510 which was filed on Apr. 15, 2019, and claims priority to Korean Patent Application No. 10-2018-0044192, which was filed on Apr. 17, 2018, the entire contents of each of which is incorporated herein by reference.

TECHNICAL FIELD

Embodiments disclosed in this specification relate to a technology for performing wireless communication by adjusting a cut-off frequency to adjust one or more reception frequency bands.

BACKGROUND ART

An electronic device performing wireless communication wirelessly receives a radio frequency (RF) signal in one or more frequency bands through an antenna. For the electronic device to receive a great amount of information during the same period, it is necessary to increase the reception speed of the electronic device performing wireless communication. To increase the reception speed of the electronic device, the electronic device receives RF signals using a plurality of frequency bands. As the electronic device uses a plurality of frequency bands, it is possible to increase the speed at which the electronic device receives RF signals. The electronic device obtains a plurality of reception signals, which are RF signals received using a plurality of frequency bands, from an RF integrated circuit (IC).

The electronic device implements a carrier aggregation (CA) mode in which reception signals are received using a plurality of frequency bands as a reception frequency band. The electronic device may increase the reception speed of wireless communication by bundling and using a plurality of frequency bands through the CA mode.

DISCLOSURE

Technical Problem

As an electronic device performing wireless communication uses a plurality of frequency bands, the number of frequency bands used in the electronic device has increased. As the number of frequency bands used by the electronic device increases, the electronic device may select and use low-low, mid-mid, or high-high frequency bands among a plurality of preset frequency bands. At least some of the reception frequency bands of low-low, mid-mid, or high-high may overlap with each other. When at least part of a plurality of reception frequency bands overlaps with each other, it is not easy to implement a CA mode in an electronic device.

Technical Solution

According to an embodiment disclosed in this specification, an electronic device may include an antenna module including one or more antennas transmitting or receiving a signal in a first frequency band and a second frequency band wirelessly, a first duplexer separating the first frequency band into a first transmission frequency band and a first reception frequency band and adjusting the first reception frequency band, a second duplexer separating the second frequency band into a second transmission frequency band and a second reception frequency band and adjusting the second reception frequency band, and a diplexer including a first terminal electrically connected to the antenna module, a first filter passing the first frequency band, a second terminal electrically connected to the first filter and the first duplexer, a second filter passing the second frequency band, and a third terminal electrically connected to the second filter and the second duplexer. The diplexer may adjust a cut-off frequency of the first filter or the second filter in connection with the first reception frequency band adjusted through the first duplexer or the second reception frequency band adjusted through the second duplexer.

Furthermore, according to an embodiment disclosed in this specification, an electronic device includes one or more antennas transmitting or receiving a signal in a first frequency band and a second frequency band wirelessly, a first duplexer separating the first frequency band into a first transmission frequency band and a first reception frequency band and adjusting the first reception frequency band, a second duplexer separating the second frequency band into a second transmission frequency band and a second reception frequency band and adjusting the second reception frequency band, and a diplexer including a first terminal electrically connected to an antenna module including the one or more antennas, a first filter passing the first frequency band, a second terminal electrically connected to the first filter and the first duplexer, a second filter passing the second frequency band, and a third terminal electrically connected to the second filter and the second duplexer, and adjusting a cut-off frequency of the first filter or the second filter depending on whether to use the first reception frequency band and the second reception frequency band, and a processor operatively connected to the first duplexer, the second duplexer, and the diplexer. The processor is configured to adjust the cut-off frequency to be higher than the first reception frequency band in a case of a first mode, to adjust the cut-off frequency to be lower than the first reception frequency band, and to adjust the second reception frequency band to a frequency band lower than the adjusted cut-off frequency through the second duplexer, in a case of a second mode, and to adjust the cut-off frequency to be higher than the second reception frequency band, and to adjust the first reception frequency band to a frequency band higher than the adjusted cut-off frequency through the first duplexer, in a case of a third mode.

Moreover, according to an embodiment disclosed in this specification, an electronic device includes a communication circuit supporting a wireless communication, using a first frequency band and a second frequency band at least partly overlapping with the first frequency band, and one or more antennas electrically connected to the communication circuit. The communication circuit includes a diplexer connected to the one or more antennas and selectively passing at least one of a first reception signal obtained through the first frequency band and a second reception signal obtained through the second frequency band, by using a cut-off frequency. The communication circuit is configured to adjust a cut-off frequency of the diplexer depending on whether at least one frequency band of the first frequency band and the second frequency band is used.

Advantageous Effects

According to various embodiments disclosed in this specification, when using a plurality of frequency bands of which at least some overlap with one another, an electronic device may adjust the cut-off frequency depending on whether reception frequency bands are used. Even when using all reception frequency bands, the electronic device may receive all reception signals. Accordingly, even when at least some of a plurality of reception frequency bands overlap with one another, the electronic device may improve the speed at which a reception signal is received, by implementing a CA mode. In other words, even when the electronic device selects and uses frequency bands of low-low, mid-mid, or high-high among a plurality of frequency bands, the electronic device may implement CA, thereby freely setting a plurality of frequency bands.

Besides, a variety of effects directly or indirectly understood through the disclosure may be provided.

DESCRIPTION OF DRAWINGS

FIG. 2 is a diagram illustrating a plurality of frequency bands used by an electronic device according to an embodiment.

With regard to description of drawings, the same or similar components may be marked by the same or similar reference numerals.

MODE FOR INVENTION

Hereinafter, various embodiments of the disclosure will be described with reference to accompanying drawings. However, it should be understood that this is not intended to limit the disclosure to specific implementation forms and includes various modifications, equivalents, and/or alternatives of embodiments of the disclosure.

Figure 1:
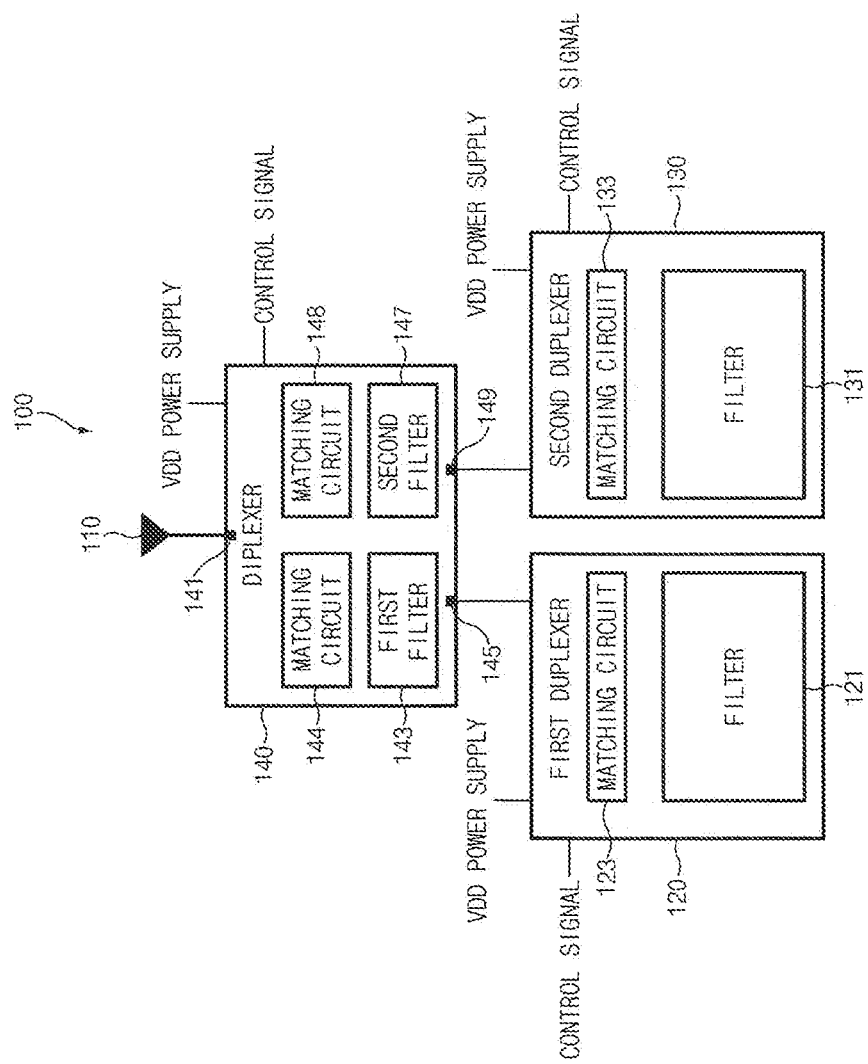
FIG. 1 is a diagram illustrating an electronic device, according to an embodiment.

FIG. 1 is a diagram illustrating an electronic device 100 according to an embodiment. According to an embodiment, the electronic device 100 may include one or more antennas 110, a first duplexer 120, a second duplexer 130, and a diplexer 140.

According to an embodiment, the one or more antennas 110 may wirelessly receive signals in a plurality of predetermined frequency bands. The one or more antennas 110 may constitute an antenna array or an antenna module. Each of the antennas constituting the one or more antennas 110 may receive signals included in one frequency band. For example, the one or more antennas 110 may include a first antenna wirelessly receiving a signal in a first frequency band and a second antenna wirelessly receiving a signal in a second frequency band. However, an embodiment is not limited thereto, and each of the antennas constituting the one or more antennas 110 may receive signals included in a plurality of adjacent band frequencies. Furthermore, each of the antennas constituting the one or more antennas 110 may receive signals included in some channels among a plurality of channels included in a single band frequency.

The first frequency band according to an embodiment may include a first reception frequency band and a first transmission frequency band. The first reception frequency band may be spaced from each other by a predetermined frequency range from the first transmission frequency band. In this specification, it is assumed that the frequency range in the first reception frequency band is lower than the frequency range in the first transmission frequency band. However, an embodiment is not limited thereto. The frequency range in the first reception frequency band may be higher than the frequency range in the first transmission frequency band.

The first duplexer 120 according to an embodiment may divide a signal in a first frequency band into a first reception signal and a first transmission signal. The first reception signal is a signal corresponding to the first reception frequency band, and the first transmission signal is a signal corresponding to the first transmission frequency band. The first duplexer 120 may include a filter circuit 121 and a matching circuit 123.

In an embodiment, the filter circuit 121 may include one or more band pass filter (BPF) having a specified resonance frequency band. The filter circuit 121 may be implemented through the combination of a BPF for passing a first transmission frequency band and a BPF for passing a first reception frequency band. The filter circuit 121 may filter signals other than the first frequency band.

In an embodiment, the matching circuit 123 may match the impedance between the one or more antennas 110 and the filter circuit 121. The matching circuit 123 may change the pass band of the BPF constituting the filter circuit 121. The first duplexer 120 including the matching circuit 123 may be a duplexer capable of tuning the first reception frequency band being used. The matching circuit 123 may change the highest or lowest value of the first reception frequency band being used. The matching circuit 123 may change the width of the first reception frequency band being used.

In an embodiment, the matching circuit 123 may include a plurality of inductors, a plurality of capacitors, and a plurality of switches. A switch may be positioned between an inductor and a capacitor. When the switch is opened, the inductor and the capacitor connected to the switch may be electrically blocked. When the switch is shorted, the inductor and the capacitor connected to the switch may be electrically connected. The matching circuit 123 may receive a voltage (e.g., VDD voltage) from a power supply (e.g., a power management module 1588 of FIG. 15) to operate the switch. The matching circuit 123 may receive a control signal capable of controlling opening and shorting of the switch.

In an embodiment, the matching circuit 123 may vary matching. The matching circuit 123 may change the impedance based on a side to be matched. The matching circuit 123 may change the number of a plurality of inductors and a plurality of capacitors, which are connected to a plurality of switches, to change the impedance. The matching circuit 123 may change the matching to have the same impedance value as the device to be matched. For example, the matching circuit 123 of the first duplexer 120 may be matched to have the same impedance value as the matching circuit of the diplexer 140.

According to an embodiment, the second frequency band may include a second reception frequency band and a second transmission frequency band. In this specification, an embodiment is exemplified as the second reception frequency band is higher than the second transmission frequency band. However, an embodiment is not limited thereto. The second reception frequency band may be lower than the second transmission frequency band.

The second reception frequency band and the second transmission frequency band may be spaced from each other by a predetermined frequency range. In this specification, an embodiment is exemplified as at least part of the first reception frequency band overlaps with at least part of the second reception frequency band. However, an embodiment is not limited thereto. At least part of the first frequency band may be disposed within the second frequency band. Accordingly, at least part of the first frequency band may be included between the second transmission frequency band and the second reception frequency band.

The second duplexer 130 according to an embodiment may separate a signal in a second frequency band into a second reception signal and a second transmission signal. The second reception signal is a signal corresponding to the second reception frequency band, and the second transmission signal is a signal corresponding to the second transmission frequency band. The second duplexer 130 may include a filter circuit 131 and a matching circuit 133. The configuration and function of the filter circuit 131 and the matching circuit 133 included in the second duplexer 130 are the same as the configuration and function of the filter circuit 121 and the matching circuit 123 included in the first duplexer 120, and thus the detailed descriptions thereof will be omitted.

According to an embodiment, the diplexer 140 may separate signals received through the one or more antennas 110 based on a cut-off frequency. The diplexer 140 may include a first terminal 141, a first filter 143, a second terminal 145, a second filter 147, and a third terminal 149. The diplexer 140 may set a cut-off frequency such that the signal output through the first filter 143 and the signal output through the second filter 147 are separated from each other. The diplexer 140 may include a matching circuit 144 capable of changing matching of the first filter 143 and a matching circuit 148 capable of changing matching of the second filter 147.

In an embodiment, the first terminal 141 may be connected to the one or more antennas 110. The one or more antennas 110 may receive a first reception signal and a second reception signal. The first terminal 141 may be electrically connected to an antenna module including the one or more antennas 110. The antenna module may be an integrated antenna IC chip connected to the diplexer 140 receiving signals included in a plurality of frequency bands.

In an embodiment, the first reception signal may be delivered to the first filter 143 through the first terminal 141. The second reception signal may be delivered to the second filter 147 through the first terminal 141.

In an embodiment, the first filter 143 may separate the first frequency band from the second frequency band. The first filter 143 may pass a signal having a frequency higher than the cut-off frequency. The first filter 143 may be implemented with a high pass filter (HPF). The first filter 143 may pass a first frequency band. The first filter 143 may be connected to the matching circuit 144. The matching circuit 144 may change the frequency pass characteristic of the first filter 143 by changing the matching of the first filter 143.

In an embodiment, the second terminal 145 may be electrically connected to the first filter 143 and the first duplexer 120. The first reception signal may be delivered to the first duplexer 120 through the second terminal 145.

In an embodiment, the second filter 147 may separate the second frequency band from the first frequency band. The second filter 147 may pass a signal having a frequency lower than the cut-off frequency. The second filter 147 may be implemented with a low pass filter (LPF). The second filter 147 may pass the second frequency band. The second filter 147 may be connected to the matching circuit 148. The matching circuit 148 may change the frequency pass characteristic of the second filter 147 by changing the matching of the second filter 147.

In an embodiment, the third terminal 149 may be electrically connected to the second filter 147 and the second duplexer 130. The second reception signal may be delivered to the second duplexer 130 through the third terminal 149.

In this specification, it is assumed that the first filter 143 passes a first reception signal and the second filter 147 passes a second reception signal. However, an embodiment is not limited thereto. The first filter 143 may pass a second reception signal, and the second filter 147 may pass a first reception signal. In this case, the first reception signal may be delivered to the second duplexer 130; the second reception signal may be delivered to the first duplexer 120.

Figure 15:
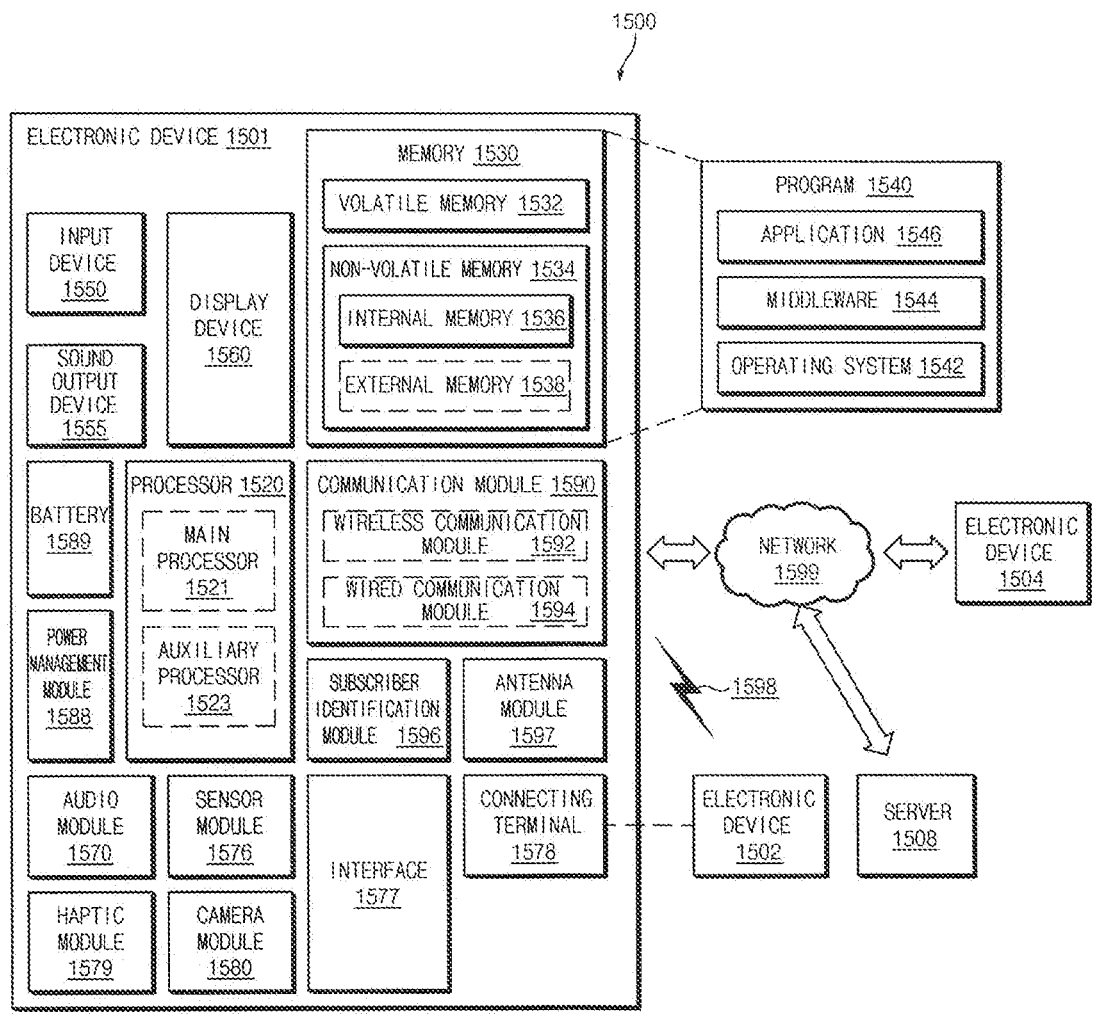
FIG. 15 is a block diagram illustrating an electronic device in a network environment according to various embodiments.

In an embodiment, each of the first duplexer 120, the second duplexer 130, and the diplexer 140 may obtain a voltage (e.g., VDD voltage) generated by a power supply unit (e.g., the power management module 1588 in FIG. 15). Each of the first duplexer 120, the second duplexer 130, and the diplexer 140 may obtain a control signal generated by a processor (e.g., a processor 1520 of FIG. 15). The processor may be operatively connected to the first duplexer 120, the second duplexer 130, and the diplexer 140.

FIG. 2 is a diagram illustrating a plurality of frequency bands 210 and 220 used by the electronic device 100 according to an embodiment.

In an embodiment, the plurality of frequency bands 210 and 220 may include the first frequency band 210 and the second frequency band 220. The first frequency band 210 may have a higher frequency than the second frequency band 220. The first frequency band 210 and the second frequency band 220 may be used for the communication in the scheme of frequency division duplexing (FDD). The reception frequency band may be spaced from the transmission frequency band by a predetermined frequency range.

In an embodiment, the first frequency band 210 may include a first transmission frequency band 211 and a first reception frequency band 213. The first reception frequency band 213 may have a first reception frequency highest value RH1 and a first reception frequency lowest value RL1. The second frequency band 220 may include a second transmission frequency band 221 and a second reception frequency band 223. The second reception frequency band 223 may have a second reception frequency highest value RH2 and a second reception frequency lowest value RL2.

In an embodiment, the first frequency band 210 may at least partly overlap with the second frequency band 220. In particular, the first reception frequency band 213 and the second reception frequency band 223 may at least partly overlap with each other. When the second reception frequency highest value RH2 is higher than the first reception frequency lowest value RL1, the first reception frequency band 213 and the second reception frequency band 223 may overlap with each other in a range of the first reception frequency lowest value RL1 or more and the second reception frequency highest value RH2 or less.

For example, when the first frequency band 210 is a band 20 defined in 3rd generation partnership project (3GPP), the first transmission frequency band 211 is not less than about 832 MHz and is not greater than about 862 MHz, and the first reception frequency band 213 is not less than about 791 MHz and is not greater than about 821 MHz. When the second frequency band 220 is a band 28 defined in 3GPP, the second transmission frequency band 221 is not less than about 703 MHz and is not greater than about 748 MHz, and the second reception frequency band 223 is not less than about 758 MHz and is not greater than about 803 MHz. The first reception frequency band 213 and the second reception frequency band 223 may overlap with each other in a frequency section of about 791 MHz or more and about 803 MHz or less.

Figure 3:
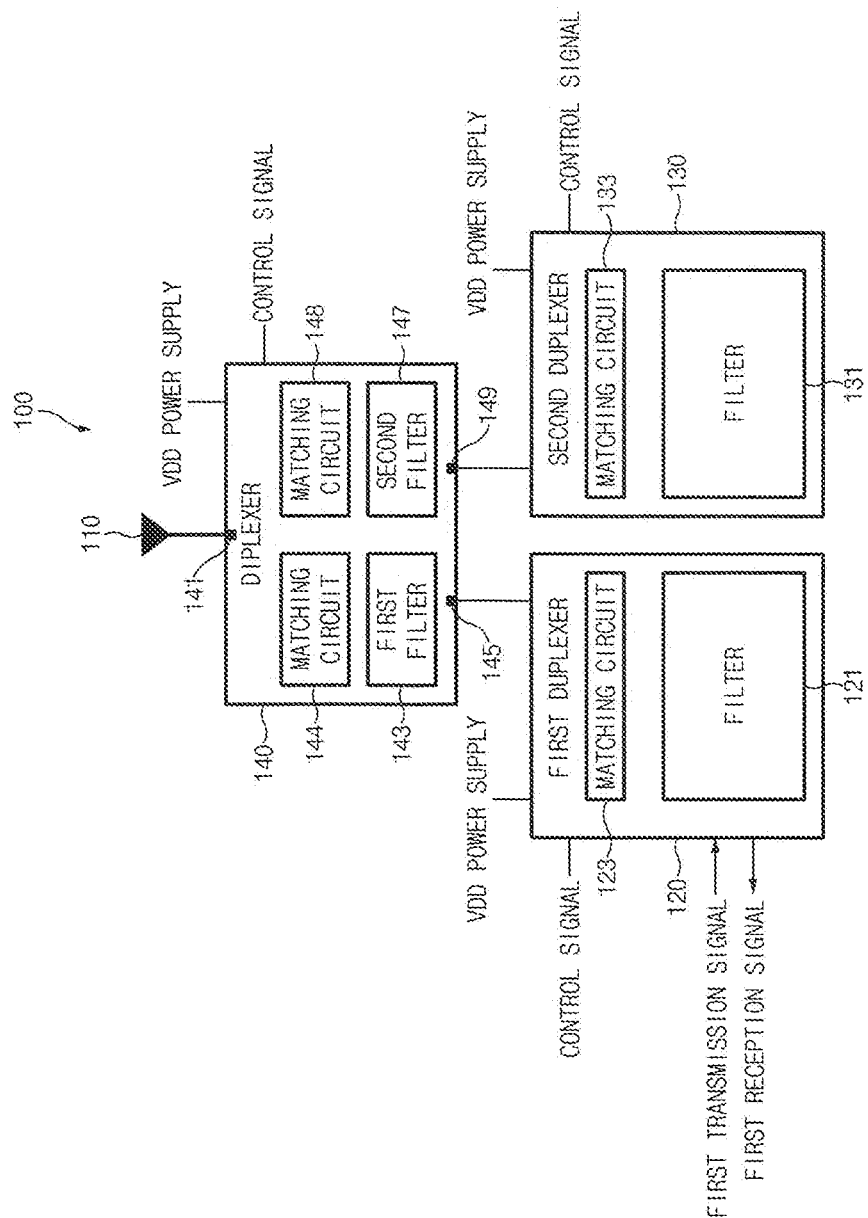
FIG. 3 is a diagram in a case where an electronic device uses a first frequency band, according to an embodiment.
Figure 4:
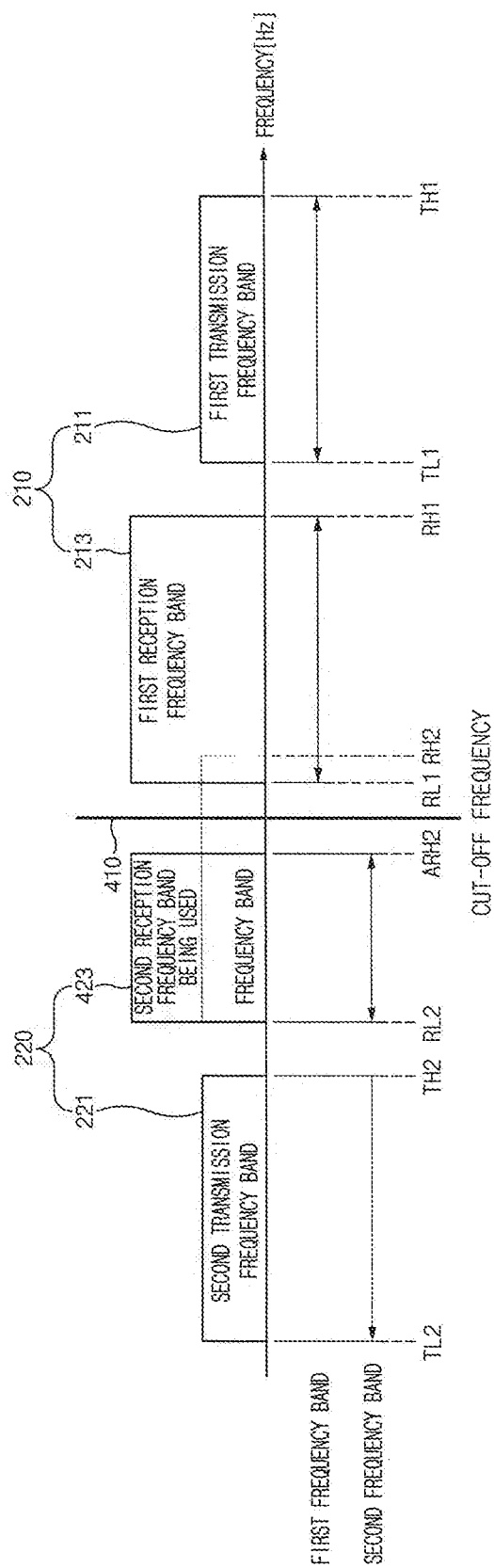
FIG. 4 is a diagram illustrating a plurality of frequency bands and a cut-off frequency in a case where an electronic device uses a first frequency band, according to an embodiment.

FIG. 3 is a diagram in a case where the electronic device 100 uses the first frequency band 210, according to an embodiment. FIG. 4 is a diagram illustrating a plurality of frequency bands 210 and 220 and a cut-off frequency 410 in a case where the electronic device 100 uses the first frequency band 210, according to an embodiment. An embodiment is exemplified in FIGS. 3 and 4 as the electronic device 100 according to an embodiment uses only the first frequency band 210; in FIGS. 3 and 4, it is shown that a first transmission signal is input from a communication module (e.g., a communication module 1590 of FIG. 15) of the electronic device 100 to the first duplexer 120, and the first reception signal is output from the first duplexer 120 to the communication module.

In an embodiment, the first transmission signal may be input to the first duplexer 120. The first transmission signal may be an RF signal having a frequency included in the first transmission frequency band 211. The first transmission signal may be delivered to the diplexer 140 through the filter 121 of the first duplexer 120. The first transmission signal may be output through the one or more antennas 110 via the first filter 143 of the diplexer 140.

In an embodiment, the first reception signal may be delivered from the one or more antennas 110 to the diplexer 140. The first reception signal may be an RF signal having a frequency included in the first reception frequency band 213. The first reception signal may be delivered to the first duplexer 120 via the first filter 143 of the diplexer 140. The first reception signal may pass through the filter 121 of the first duplexer 120.

In an embodiment, the first transmission signal may be output through the one or more antennas 110, and the first reception signal may be input through the one or more antennas 110. To improve the power transfer characteristics of the one or more antennas 110 and to minimize distortion, the impedance of each of the one or more antennas 110 may be matched.

In an embodiment, when the electronic device 100 uses the first frequency band 210, the electronic device 100 may output a first transmission signal included in the first transmission frequency band 211 through the one or more antennas 110. The electronic device 100 may receive a first reception signal included in the first reception frequency band 213. When the electronic device 100 uses the entire first frequency band 210, the information and characteristics of the first transmission signal and the first reception signal may be maintained.

In an embodiment, when the electronic device 100 uses the first frequency band 210, the diplexer 140 of the electronic device 100 may adjust the cut-off frequency 410 such that the first frequency band 210 passes through the filter. The diplexer 140 may adjust the cut-off frequency 410 to be lower than the first reception frequency band 213.

In an embodiment, the matching circuits 144 and 148 of the diplexer 140 may include a plurality of inductors, a plurality of capacitors, and a plurality of switches. A switch may be positioned between an inductor and a capacitor. The matching circuits 144 and 148 may receive a voltage (e.g., VDD voltage) from a power supply (e.g., the power management module 1588 of FIG. 15) to operate the switch. The matching circuits 144 and 148 may receive a control signal capable of controlling a connection state of a switch.

In an embodiment, the inductor and the capacitor connected to the switches of the matching circuits 144 and 148 of the diplexer 140 may be electrically connected to each other. The switch may be controlled to vary matching such that one or more inductors or one or more capacitors, which have different capacities, from among a plurality of inductors and a plurality of capacitors are selectively connected to each other. The diplexer 140 may change the impedance of the diplexer 140 through switches of the matching circuits 144 and 148. The matching circuits 144 and 148 may implement a tunable matching circuit that changes the characteristics of the diplexer 140 while changing the impedance through the switches. The diplexer 140 may adjust the cut-off frequency 410 while changing the frequency characteristics of the first filter 143 and the second filter 147 through matching circuits 144 and 148.

In an embodiment, the first reception signal may pass through the first filter 143 of the diplexer 140. The electronic device 100 may pass all signals corresponding to the first reception frequency band 213.

In an embodiment, when at least some of the first reception frequency band 213 and the second reception frequency band 223 overlap with each other, the second reception frequency band 223 and the first transmission frequency band 211 of the electronic device 100 may be more adjacent to each other than a predetermined frequency range. When the second reception frequency band 223 of the electronic device 100 is adjacent to the first transmission frequency band 211, the frequency of the first transmission signal may be included in the second reception frequency band 223. When the frequency of the first transmission signal is included in the second reception frequency band 223, all the first transmission signal may not be delivered to the one or more antennas 110, but the first transmission signal may be delivered at least partly to the second duplexer 130. When the first transmission signal is at least partly transmitted to the second duplexer 130, the transmission efficiency of the first transmission signal may be degraded.

In an embodiment, when the electronic device 100 uses the first frequency band 210, the second duplexer 130 of the electronic device 100 may adjust a reception frequency 423 of the used second duplexer to be lower than the cut-off frequency 410. To adjust the second reception frequency band 423 to be lower than the cut-off frequency 410, the second duplexer 130 may change the reception frequency 423 of the second duplexer by reducing the second reception frequency highest value RH2 to adjust the reduced second reception frequency highest value RH2 to the second adjustment reception frequency highest value ARH2. For example, as illustrated in FIG. 4, the second duplexer 130 may reduce the bandwidth of the reception frequency 423 of the second duplexer by adjusting the second adjustment reception frequency highest value ARH2 through the matching circuit 133. For another example, the bandwidth of the reception frequency 423 of the second duplexer may be maintained through the matching circuit 133, and the second duplexer 130 may shift the reception frequency 423 of the second duplexer to a frequency lower than the cut-off frequency 410 as a whole. For example, when the first frequency band 210 is band 20 and the second frequency band 220 is band 28, the diplexer 140 may set about 785 MHz lower than about 791 MHz, which is the lowest value of the first reception frequency band 213, as the cut-off frequency 410. When the diplexer 140 sets the cut-off frequency 410 to about 785 MHz, the second duplexer 130 may adjust the reception frequency 423 of the second duplexer by setting the second adjustment reception frequency highest value ARH2 to about 775 MHz lower than about 785 MHz that is the second reception frequency highest value RH2. For example, as illustrated in FIG. 4, it is possible to reduce the bandwidth of the reception frequency 423 of the second duplexer. For another example, the bandwidth of the reception frequency 423 of the second duplexer may be maintained, and the reception frequency 423 of the second duplexer may be shifted to a frequency lower than the cut-off frequency 410 as a whole.

In an embodiment, the second duplexer 130 of the electronic device 100 may adjust the second reception frequency band 423 to be significantly spaced from the first transmission frequency band 211 in terms of a frequency range, by adjusting the second reception frequency band 423 being used. The electronic device 100 may adjust the second reception frequency band 423 to be significantly spaced from the first transmission frequency band 211 in terms of a frequency range, thereby preventing the first transmission signal from leaking through the second duplexer 130. Accordingly, the electronic device 100 may improve the transmission efficiency of a first transmission signal.

Figure 5:
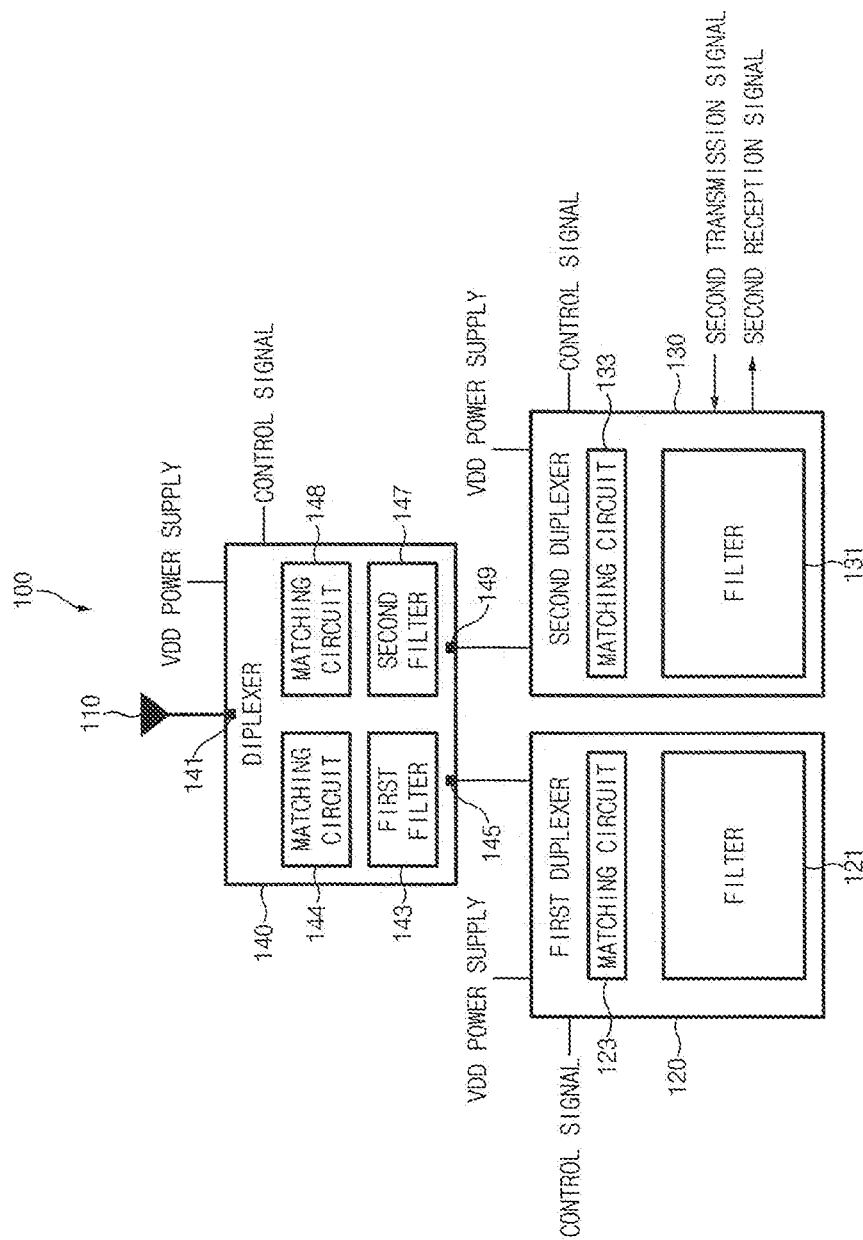
FIG. 5 is a diagram in a case where an electronic device uses a second frequency band, according to an embodiment.
Figure 6:
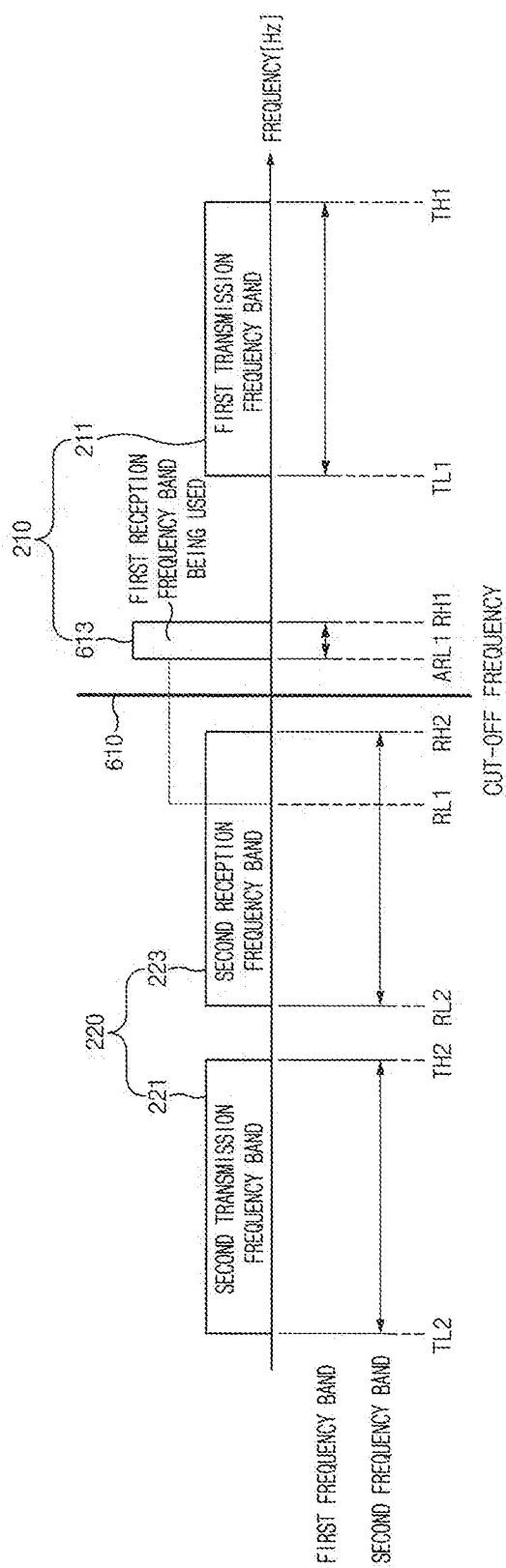
FIG. 6 is a diagram illustrating a plurality of frequency bands and a cut-off frequency in a case where an electronic device uses a second frequency band, according to an embodiment.

FIG. 5 is a diagram in a case where the electronic device 100 uses the second frequency band 220, according to an embodiment. FIG. 6 is a diagram illustrating a plurality of frequency bands 210 and 220 and a cut-off frequency 610 in a case where the electronic device 100 uses the second frequency band 220, according to an embodiment. An embodiment is exemplified in FIGS. 5 and 6 as the electronic device 100 according to an embodiment uses only the second frequency band 220; in FIGS. 5 and 6, it is shown that a second transmission signal is input from a communication module (e.g., the communication module 1590 of FIG. 15) of the electronic device 100 to the second duplexer 130, and the second reception signal is output from the second duplexer 130 to the communication module.

In an embodiment, the second transmission signal may be input to the second duplexer 130. The second transmission signal may be an RF signal having a frequency included in the second transmission frequency band 221. The second transmission signal may be delivered to the diplexer 140 through the filter 131 of the second duplexer 130. The second transmission signal may be output through the one or more antennas 110 via the second filter 147 of the diplexer 140.

In an embodiment, the second reception signal may be delivered from the one or more antennas 110 to the diplexer 140. The second reception signal may be an RF signal having a frequency included in the second reception frequency band 223. The second reception signal may be delivered to the second duplexer 130 via the second filter 147 of the diplexer 140. The second reception signal may pass through the filter 131 of the second duplexer 130.

In an embodiment, when the electronic device 100 uses the second frequency band 220, the electronic device 100 may output a second transmission signal included in the second transmission frequency band 221 through the one or more antennas 110. The electronic device 100 may receive a second reception signal included in the second reception frequency band 223. When the electronic device 100 uses the entire second frequency band 220, the information and characteristics of the second transmission signal and the second reception signal may be maintained.

In an embodiment, when the electronic device 100 uses the second frequency band 220, the diplexer 140 of the electronic device 100 may adjust the cut-off frequency 610 such that the second frequency band 220 passes through the filter. The diplexer 140 may adjust the cut-off frequency 610 to be higher than the second reception frequency band 223.

In an embodiment, the second reception signal may pass through the second filter 147 of the diplexer 140. The electronic device 100 may pass all signals corresponding to the second reception frequency band 223.

In an embodiment, when at least some of the first reception frequency band 213 and the second reception frequency band 223 overlap with each other, the first reception frequency band 213 and the second transmission frequency band 221 of the electronic device 100 may be more adjacent to each other than a predetermined frequency range. When the first reception frequency band 213 of the electronic device 100 is adjacent to the second transmission frequency band 221, the frequency of the second transmission signal may be included in the first reception frequency band 213. When the frequency of the second transmission signal is included in the first reception frequency band 213, all the second transmission signal may not be delivered to the one or more antennas 110, but the second transmission signal may be delivered at least partly to the first duplexer 120. When the second transmission signal is at least partly transmitted to the first duplexer 120, the transmission efficiency of the second transmission signal may be degraded.

In an embodiment, when the second frequency band 220 is used, the first duplexer 120 of the electronic device 100 may adjust a reception frequency 613 of the used first duplexer to be higher than the cut-off frequency 610. To adjust the reception frequency 613 of the first duplexer to be higher than the cut-off frequency 610, the first duplexer 120 may change the reception frequency 613 of the first duplexer by increasing the first reception frequency lowest value RL1 to adjust the first reception frequency lowest value RL1 to a first adjustment reception frequency lowest value ARL1. For example, as illustrated in FIG. 6, the first duplexer 120 may reduce the bandwidth of the reception frequency 613 of the first duplexer through the matching circuit 123. For another example, the bandwidth of the reception frequency 613 of the first duplexer may be maintained through the matching circuit 123, and the first duplexer 120 may shift the reception frequency 613 of the first duplexer to a frequency higher than the cut-off frequency 610 as a whole.

For example, when the first frequency band 210 is band 20 and the second frequency band 220 is band 28, the diplexer 140 may set about 810 MHz higher than about 803 MHz, which is the highest value of the second reception frequency band 613, as the cut-off frequency 610. When the diplexer 140 sets the cut-off frequency 610 to about 810 MHz, the first duplexer 120 may adjust the reception frequency 613 of the first duplexer by setting the first adjustment reception frequency lowest value ARL1 to about 820 MHz higher than about 810 MHz that is the first reception frequency lowest value RL1. For example, as illustrated in FIG. 6, it is possible to reduce the bandwidth of the reception frequency 613 of the first duplexer. For another example, the bandwidth of the reception frequency 613 of the first duplexer may be maintained, and the reception frequency 613 of the first duplexer may be shifted to a frequency higher than the cut-off frequency 610 as a whole.

In an embodiment, the first duplexer 120 of the electronic device 100 may adjust the first reception frequency band 613 to be significantly spaced from the second transmission frequency band 221 in terms of a frequency range, by adjusting the first reception frequency band 613 being used. The electronic device 100 may adjust the first reception frequency band 613 to be significantly spaced from the second transmission frequency band 221 in terms of a frequency range, thereby preventing the second transmission signal from leaking through the first duplexer 120. Accordingly, the electronic device 100 may improve the transmission efficiency of a second transmission signal.

Figure 7:
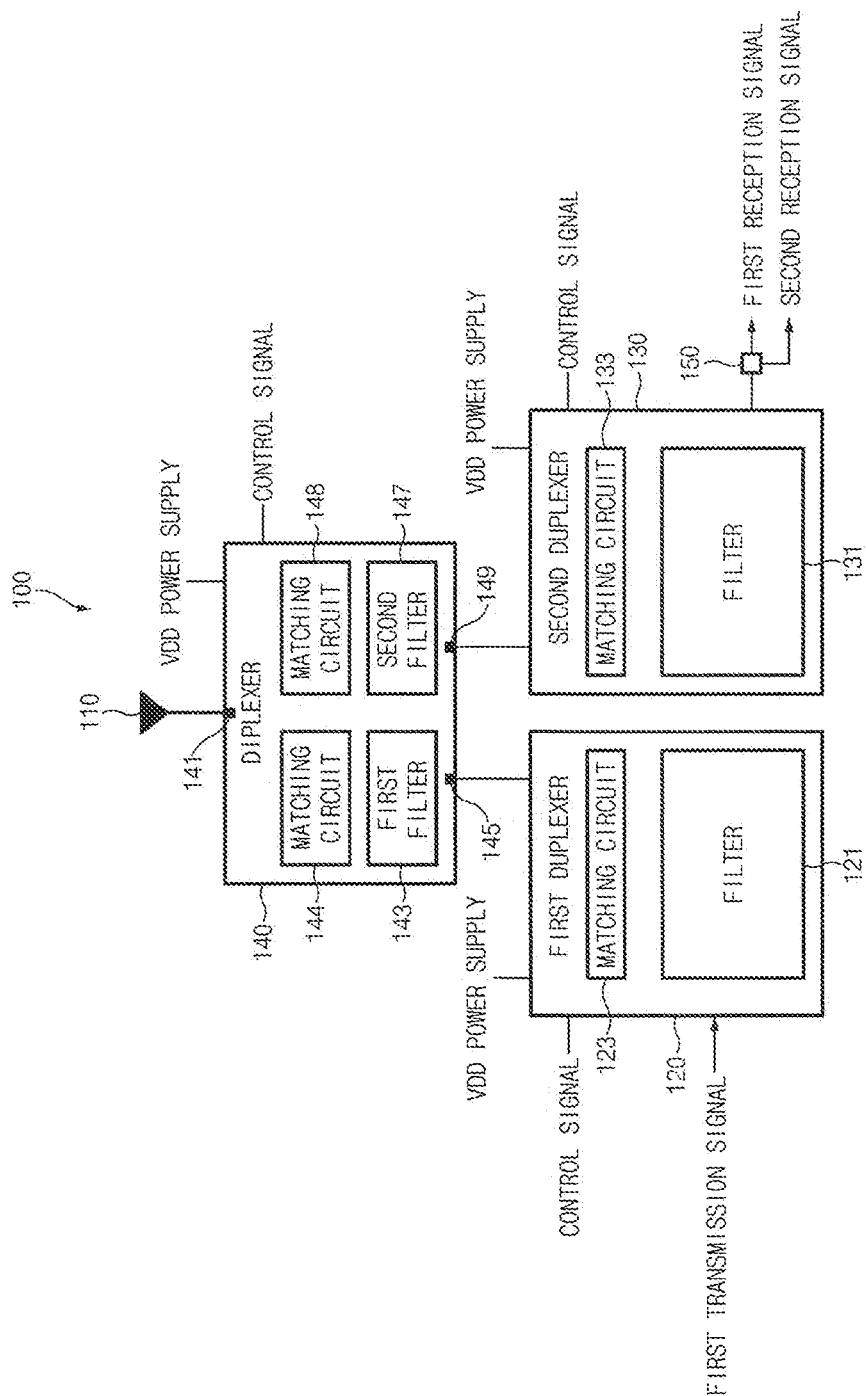
FIG. 7 is a diagram in a case where an electronic device operates in a CA mode using a first frequency band and a second frequency band, according to an embodiment.
Figure 8:
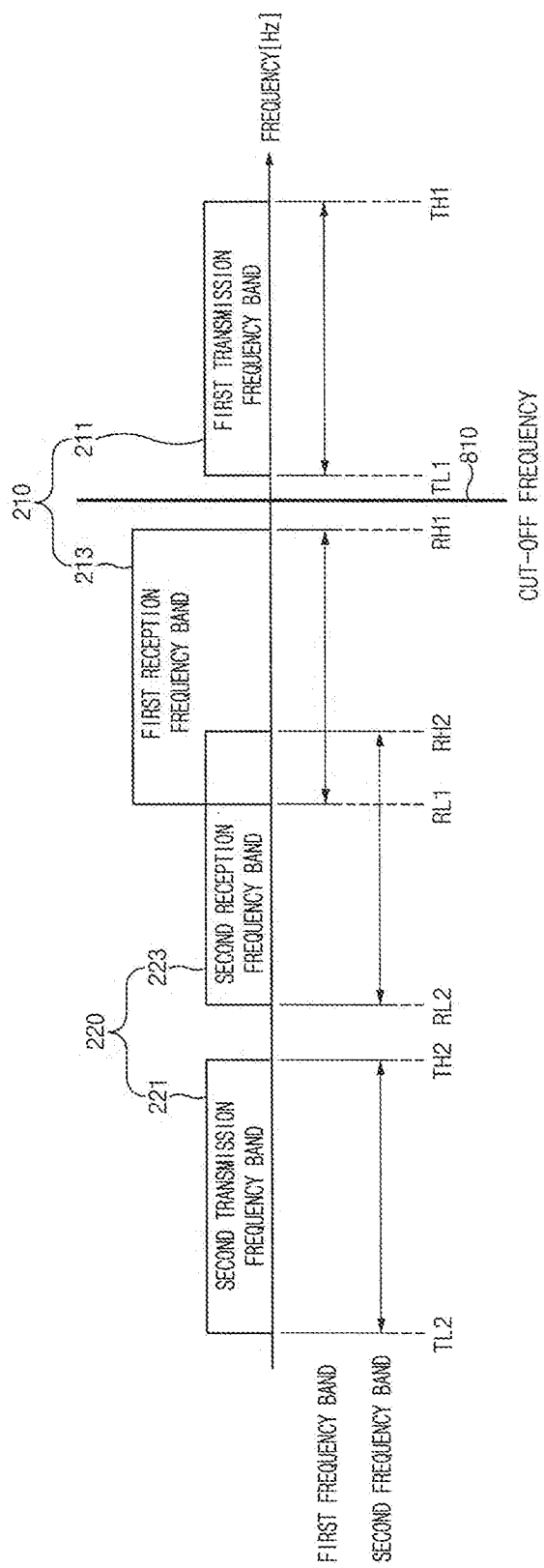
FIG. 8 is a diagram illustrating a plurality of frequency bands and a cut-off frequency in a case where an electronic device operates in a CA mode using a first frequency band and a second frequency band, according to an embodiment.

FIG. 7 is a diagram in a case where the electronic device 100 operates in a CA mode using the first frequency band 210 and the second frequency band 220, according to an embodiment. FIG. 8 is a diagram illustrating a plurality of frequency bands 210 and 220 and a cut-off frequency 810 in a case where the electronic device 100 operates in a CA mode using the first frequency band 210 and the second frequency band 220, according to an embodiment. An embodiment is exemplified in FIGS. 7 and 8 as the electronic device 100 according to an embodiment operates a CA mode; in FIGS. 7 and 8, it is shown that a first transmission signal is input from a communication module (e.g., the communication module 1590 of FIG. 15) of the electronic device 100 to the first duplexer 120, and the first reception signal and the second reception signal are output from the second duplexer 130 to the communication module.

In an embodiment, the first transmission signal may be input to the first duplexer 120. The first transmission signal may be delivered to the diplexer 140 through the filter 121 of the first duplexer 120. The first transmission signal may be output through the one or more antennas 110 via the first filter 143 of the diplexer 140.

In an embodiment, the first reception signal may be delivered from the one or more antennas 110 to the diplexer 140. The first reception signal may be delivered to the second duplexer 130 via the second filter 147 of the diplexer 140. The first reception signal may pass through the filter 131 of the second duplexer 130.

In an embodiment, the second reception signal may be delivered from the one or more antennas 110 to the diplexer 140. The second reception signal may be delivered to the second duplexer 130 via the second filter 147 of the diplexer 140. The second reception signal may pass through the filter 131 of the second duplexer 130.

In an embodiment, the first reception signal and the second reception signal may be output through the second duplexer 130. When the electronic device 100 operates in the CA mode, the electronic device 100 may receive a first reception signal and a second reception signal, using both the first reception frequency band 213 and the second reception frequency band 223. In the case where the electronic device 100 uses both the first reception frequency band 213 and the second reception frequency band 223, the electronic device 100 may increase the total width of the reception frequency band used by the electronic device 100, rather than the case where the electronic device 100 uses a single reception frequency band. As the electronic device 100 increases the width of the reception frequency band being used, the electronic device 100 may simultaneously receive a first reception signal belonging to the first reception frequency band 213 and a second reception signal belonging to the second reception frequency band 223. The electronic device 100 may improve the speed at which reception signals are received, by simultaneously using a plurality of frequency bands through the CA mode.

In an embodiment, the matching circuit 123 connected to the filter 121 of the first duplexer 120 may be provided outside the first duplexer 120. The matching circuit 133 connected to the filter 131 of the second duplexer 130 may be provided outside the second duplexer 130. For example, the matching circuit 123 connected to the filter 121 of the first duplexer 120 and the matching circuit 133 connected to the filter 131 of the second duplexer 130 may be implemented with a tunable matching circuit composed of a plurality of switches, a plurality of inductors, and a plurality of capacitors between the first duplexer 120 and the second duplexer 130.

The electronic device 100 according to an embodiment may further include a splitter 150 electrically connected to the second duplexer 130.

In an embodiment, the first reception signal and the second reception signal may be delivered from the second duplexer 130 to the splitter 150. The splitter 150 may separate the first reception signal and the second reception signal. The splitter 150 may include a filter circuit that separates the first reception frequency band 213 and the second reception frequency band 223. The splitter 150 may output both the first reception signal and the second reception signal that are separated.

In an embodiment, the splitter 150 may be embedded in the processor of the electronic device 100. However, an embodiment is not limited thereto, and the splitter 150 may be mounted in the RFIC. Alternatively, the splitter 150 may be built into the second duplexer 130.

In an embodiment, when the electronic device 100 operates in CA mode, the electronic device 100 may receive both a first reception signal included in the first reception frequency band 213 and a second reception signal included in the second reception frequency band 223. Only when both the first reception frequency band 213 and the second reception frequency band 223 are used, the information and characteristics of the first reception signal and the second reception signal may be maintained.

In an embodiment, when the electronic device 100 operates in the CA mode, the diplexer 140 of the electronic device 100 may adjust the cut-off frequency 810 to be higher than the first reception frequency band 213.

In an embodiment, signals corresponding to a frequency band lower than the cut-off frequency 810 may be delivered from the diplexer 140 to the second duplexer 130. The signals corresponding to a frequency band higher than the cut-off frequency 410 may be delivered from the first duplexer 120 to the diplexer 140. The first reception signal and the second reception signal may be delivered to the second duplexer 130 through the diplexer 140. The first transmission signal may be delivered to the diplexer 140 through the first duplexer 120.

For example, when the first frequency band 210 is band 20 and the second frequency band 220 is band 28, the diplexer 140 may set about 827 MHz higher than about 821 MHz, which is the first reception frequency highest value RH1, as the cut-off frequency 810. Because the first reception frequency band 213 is higher than the second reception frequency band 223, the cut-off frequency 810 may be higher than the second reception frequency highest value RH2. Both the first and second reception signals may be delivered to the second duplexer 130, by setting the cut-off frequency 810 of the diplexer 140 to a frequency higher than the first and second reception frequency highest values RH1 and RH2.

In an embodiment, when the cut-off frequency 810 of the diplexer 140 is set to a frequency higher than the first and second reception frequency highest values RH1 and RH2, the second duplexer 130 may use the first reception frequency band 213 and the second frequency band 223, as a single reception frequency band. As a result, it is possible to implement the CA mode where the first reception frequency band 213 and the second frequency band 223 that at least partly overlap with each other are used as a single reception frequency band by combining the first reception frequency band 213 and the second frequency band 223. The first reception signal and the second reception signal may be separated through the splitter 150.

In an embodiment, a case where the electronic device 100 operates in the CA mode using both the first frequency band 210 and the second frequency band 220 may be defined as the first mode. A case where the electronic device 100 according to an embodiment uses only the first frequency band 210 may be defined as a second mode. A case where the electronic device 100 according to an embodiment uses only the second frequency band 220 may be defined as a third mode.

In an embodiment, when the electronic device 100 is in the first mode, the electronic device 100 may adjust the cut-off frequency 810 to be higher than the first reception frequency band 213. When the electronic device 100 according to an example is in the second mode, the electronic device 100 may adjust the cut-off frequency 410 to be lower than the first reception frequency band 213 and may adjust the reception frequency 423 of the second duplexer to a frequency band lower than the adjusted cut-off frequency 410, through the second duplexer 130. When the electronic device 100 according to an example is in the third mode, the electronic device 100 may adjust the cut-off frequency 610 to be higher than the second reception frequency band 223 and may adjust the reception frequency 613 of the first duplexer to a frequency band higher than the adjusted cut-off frequency 610, through the first duplexer 120.

Figure 9:
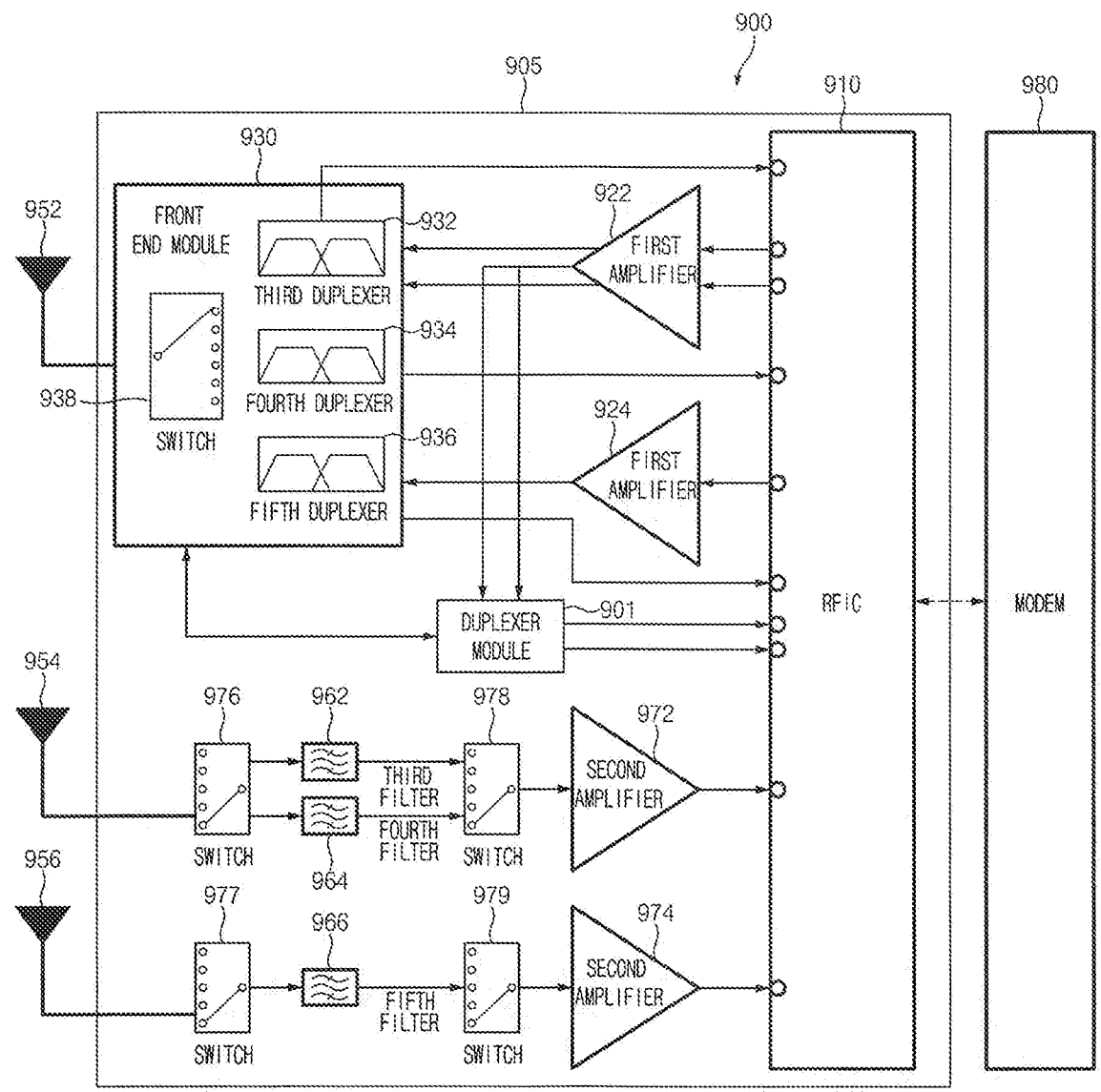
FIG. 9 is a block diagram illustrating an electronic device, according to an embodiment.

FIG. 9 is a block diagram illustrating an electronic device 900 (e.g., the electronic device 100) according to an embodiment. Referring to FIG. 9, the electronic device 900 may include a communication circuit 905 and one or more antennas 952, 954, and 956 electrically connected to the communication circuit 905.

In an embodiment, the communication circuit 905 may support wireless communication using the first frequency band 210 and the second frequency band 220 that at least partly overlaps with the first frequency band 210. The communication circuit 905 may process a signal output through at least one antenna (e.g., the antenna 952) among the one or more antennas 952, 954, and 956. The communication circuit 905 may process a signal received through the one or more antennas 952, 954, and 956.

In an embodiment, the communication circuit 905 may include a duplexer module 901, an RFIC 910, one or more first amplifiers 922 and 924, one or more second amplifiers 972 and 974, a front end module 930, third to fifth filters 962, 964, and 966, and one or more switches 976, 977, 978, and 979. The duplexer module 901 disclosed in this specification may be a module from combining the first duplexer 120, the second duplexer 130, and the diplexer 140 of the electronic device 100 described with reference to FIG. 1.

According to various embodiments disclosed in the specification, the communication circuit 905 may further include additional components. Alternatively, at least some components included in the communication circuit 905 may be omitted. For example, the communication circuit 905 may further include a reception amplifier that amplifies one or more reception signals, between the duplexer module 901 and the RFIC 910, or between third to fifth duplexers 932, 934, and 936 and the RFIC 910.

In an embodiment, the RFIC 910 may be an RF transceiver. The RFIC 910 may process a signal in a RF band. For example, the RFIC 910 may modulate a digital signal output from a modem 980 into a signal in an RF state. For another example, the RFIC 910 may demodulate a signal received in an RF state into a signal in a digital state.

In an embodiment, the one or more first amplifiers 922 and 924 may amplify one or more transmission signals. Each of the one or more first amplifiers 922 and 924 may be connected to at least one terminal included in the RFIC 910. Each of the one or more first amplifiers 922 and 924 may include a power amplifier (PA) or a transmission amplifier.

In an embodiment, the one or more first amplifiers 922 and 924 may amplify the signal output from the RFIC 910. The one or more first amplifiers 922 and 924 may obtain one or more transmission signals having the first transmission frequency band 211 and the second transmission frequency band 221 from the RFIC 910. The one or more first amplifiers 922 and 924 may amplify and provide one or more transmission signals to the diplexer 140 included in the duplexer module 901. The one or more first amplifiers 922 and 924 may be a multi-mode multi-band PA (MMMB PA) capable of amplifying signals included in a plurality of frequency bands. Alternatively, the one or more first amplifiers 922 and 924 may amplify a signal in a set frequency band. According to various embodiments disclosed in the specification, the electronic device 900 may include various numbers of first amplifiers 922 and 924 for amplifying a transmission signal.

In an embodiment, the one or more second amplifiers 972 and 974 may amplify one or more reception signals. Each of the one or more second amplifiers 972 and 974 may be connected to at least one terminal included in the RFIC 910.

Each of the one or more second amplifiers 972 and 974 may include a reception amplifier or a low noise amplifier (LNA).

In an embodiment, the one or more second amplifiers 972 and 974 may amplify a reception signal obtained by the RFIC 910. The one or more second amplifiers 972 and 974 may obtain one or more reception signals having the first reception frequency band 213 and the second reception frequency band 223 from the first duplexer 120 and the second duplexer 130 included in the duplexer module 901. The one or more second amplifiers 972 and 974 may amplify and provide one or more reception signals to the RFIC 910. The one or more second amplifiers 972 and 974 may be MMMB PAs, respectively. Alternatively, the one or more second amplifiers 972 and 974 may amplify a signal in a set frequency band. According to various embodiments disclosed in the specification, the electronic device 900 may include various numbers of second amplifiers 972 and 974 for amplifying a transmission signal.

In an embodiment, the front end module 930 may selectively deliver a transmission signal or a reception signal in an RF band. The front end module 930 may be electrically connected to the RFIC 910, the one or more first amplifiers 922 and 924, the duplexer module 901, and the antenna 952. The front end module 930 may be a front end module including duplexer (FEMID). The front end module 930 may include the third to fifth duplexers 932, 934, and 936 and a switch 938.

In an embodiment, the third to fifth duplexers 932, 934, and 936 may separate a transmission signal or a reception signal. The third to fifth duplexers 932, 934, and 936 may filter a signal in a specific frequency band, using a filter having a specified resonant frequency band. The switch 938 may electrically connect the antenna 952 to any one of the third to fifth duplexers 932, 934, and 936. The communication circuit 905 may use the third to fifth duplexers 932, 934, and 936 included in the front end module 930 and the duplexer module 901, thereby preventing the reception signal transmitted from the antenna 952 to the RFIC 910 and the transmission signal delivered from the RFIC 910 to the antenna 952 from being mixed.

In an embodiment, each of the third to fifth filters 962, 964, and 966 may filter the signal in the RF band received from each of the one or more antennas 954 and 956. The each of the third to fifth filters 962, 964, and 966 may be a surface acoustic wave (SAW) filter. The SAW filter may convert a signal, which is an electromagnetic wave having the speed of light, into SAW, which is a low-speed acoustic wave, and then may extract only a specific frequency. The SAW filter may have the narrow bandwidth of a pass frequency and the excellent characteristics at a frequency band boundary.

In an embodiment, the RFIC 910 may transmit signals in various frequency bands to the one or more first amplifiers 922 and 924. The transmission signal output from the RFIC 910 may be transmitted through the antenna 952. The transmission signal output from the RFIC 910 may be delivered to the one or more first amplifiers 922 and 924. The signal amplified and output from the one or more first amplifiers 922 and 924 may be delivered to the antenna 952 through the third to fifth duplexers 932, 934 and 936.

In an embodiment, the one or more first amplifiers 922 and 924 may amplify signals in two or more frequency bands. In this case, the one or more first amplifiers 922 and 924 may include MMMB PAs, respectively. For example, the one first amplifier 922 thereof may amplify signal power in a middle band (MB) and a low band (LB); the other first amplifier 924 thereof may amplify signal power in a high band (HB). For another example, the one first amplifier 922 may amplify signal power in HB, MB, and LB. In this case, the communication circuit 905 may include only the one first amplifier 922.

In an embodiment, the signal output from the one or more first amplifiers 922 and 924 may be delivered to the duplexer module 901 or at least one duplexer of the third to fifth duplexers 932, 934 and 936. At least one duplexer of the duplexer module 901 or the third to fifth duplexers 932, 934, and 936 may process a signal in a single specified frequency band. For example, the duplexer module may process signals corresponding to band 20 and band 28. Each of the third duplexer 932 and the fourth duplexer 934 may process a signal in MB and a signal in LB, which are output from the one first amplifier 922. The fifth duplexer 936 may process a signal in HB that is output from the other first amplifier 924. The signals output from the third to fifth duplexers 932, 934, and 936 may be delivered to the antenna 952 depending on the corresponding frequency band, using the switch 938 included in the front end module 930.

In an embodiment, the reception signal in a specific frequency band that is received from the one antenna 952 among one or more antennas 952, 954, and 956 may be delivered to the RFIC 910. The reception signal received from any one antenna 952 may be filtered by the duplexer module 901 or at least one duplexer among the third to fifth duplexers 932, 934, and 936. The filtered reception signal may be directly delivered to the RFIC 910 or may be delivered to the RFIC 910 through a reception amplifier.

In an embodiment, the reception signal in another frequency band that is received from the remaining antennas 954 and 956 among the one or more antennas 952, 954, and 956 may be selectively delivered to a corresponding filter among filters 962, 964, and 966, using a switch 976 located at the input terminals of the filters 962 and 964 and a switch 977 located at the input terminal of the filter 966. The reception signal delivered to the corresponding filter among the filters 962, 964, and 966 may be filtered based on the resonant frequency band of the corresponding filter. The filtered reception signal may be delivered to the one or more second amplifiers 972 and 974, using a switch 978 disposed at the output terminals of the filters 962 and 964 and a switch 979 disposed at the output terminal of the filter 966. The reception signal delivered to the one or more second amplifiers 972 and 974 may be amplified and delivered to the RFIC 910. The RFIC 910 may receive reception signals in various frequency bands from at least one amplifier of the one or more second amplifiers 972 and 974.

Figure 10:
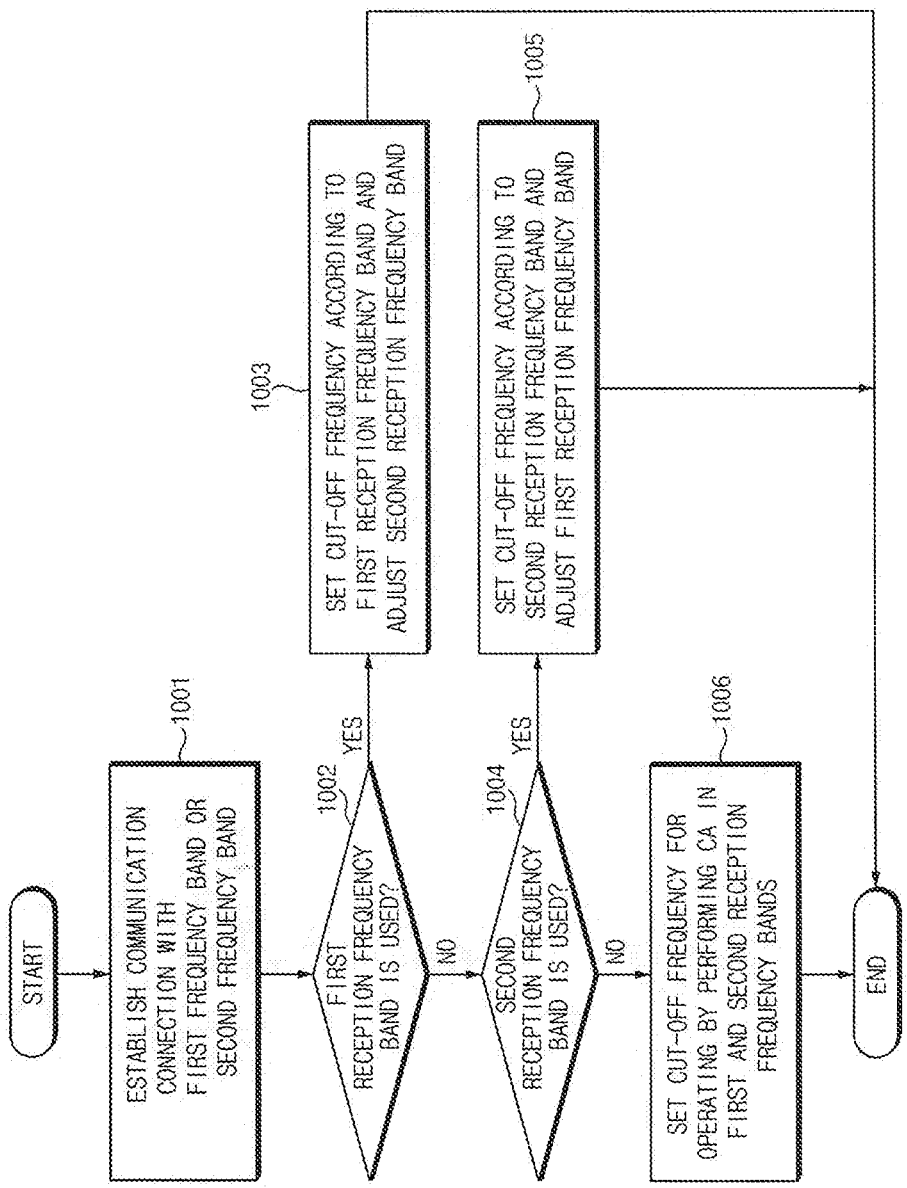
FIG. 10 is a flowchart illustrating a control method of an electronic device according to an embodiment.

FIG. 10 is a flowchart illustrating a control method of the electronic device 900 according to an embodiment. According to various embodiments, the operations illustrated in FIG. 10 may be performed through a communication module (e.g., the communication module 1590 of FIG. 15) of the electronic device 900 (e.g., an electronic device 1501 of FIG. 15) or a processor (e.g., the processor 1520 of FIG. 15).

In operation 1001, the electronic device 900 according to an embodiment may establish a communication connection with the first frequency band 210 or the second frequency band 220. The first frequency band 210 may have a higher frequency than the second frequency band 220. The first frequency band 210 may at least partly overlap with the second frequency band 220. The communication circuit 905 of the electronic device 900 may transmit a transmission signal, using the first frequency band 210, the second frequency band 220, or the first and second frequency bands 210 and 220. The communication circuit 905 of the electronic device 900 may receive a reception signal, using the first frequency band 210, the second frequency band 220, or the first and second frequency bands 210 and 220.

In operation 1002, the electronic device 900 according to an embodiment may determine whether the RFIC 910 uses the first reception frequency band 213. The electronic device 900 may detect whether the RFIC 910 uses the first frequency band 210 by using the modem 980. The electronic device 900 may analyze whether the RFIC 910 obtains a first reception signal included in the first reception frequency band 213 by using the modem 980.

In operation 1003, the electronic device 900 according to an embodiment may set the cut-off frequency 410 according to the first reception frequency band 213. The electronic device 900 may adjust the cut-off frequency 410 to a frequency lower than the first reception frequency lowest value RL1 through the duplexer module 901.

In operation 1003, the electronic device 900 according to an embodiment may adjust the second reception frequency band 423. The electronic device 900 may adjust the second reception frequency highest value RH2 to a frequency lower than the cut-off frequency 410 through the duplexer module 901.

In operation 1004, the electronic device 900 according to an embodiment may determine whether the RFIC 910 uses the second reception frequency band 223.

In operation 1005, the electronic device 900 according to an embodiment may set the cut-off frequency 610 according to the second reception frequency band 223. The electronic device 900 may adjust the cut-off frequency 610 to a frequency higher than the second reception frequency highest value RH2 through the duplexer module 901.

In operation 1005, the electronic device 900 according to an embodiment may adjust the first reception frequency band 613. The electronic device 900 may adjust the first reception frequency lowest value RL1 to a frequency higher than the cut-off frequency 610 through the duplexer module 901.

In operation 1006, the electronic device 900 according to an embodiment may set the cut-off frequency 810 for operating by performing CA in the first and second reception frequency bands 213 and 223. The electronic device 900 may adjust the cut-off frequency 810 to a frequency higher than the first reception frequency highest value RH1 through the duplexer module 901.

Figure 11:
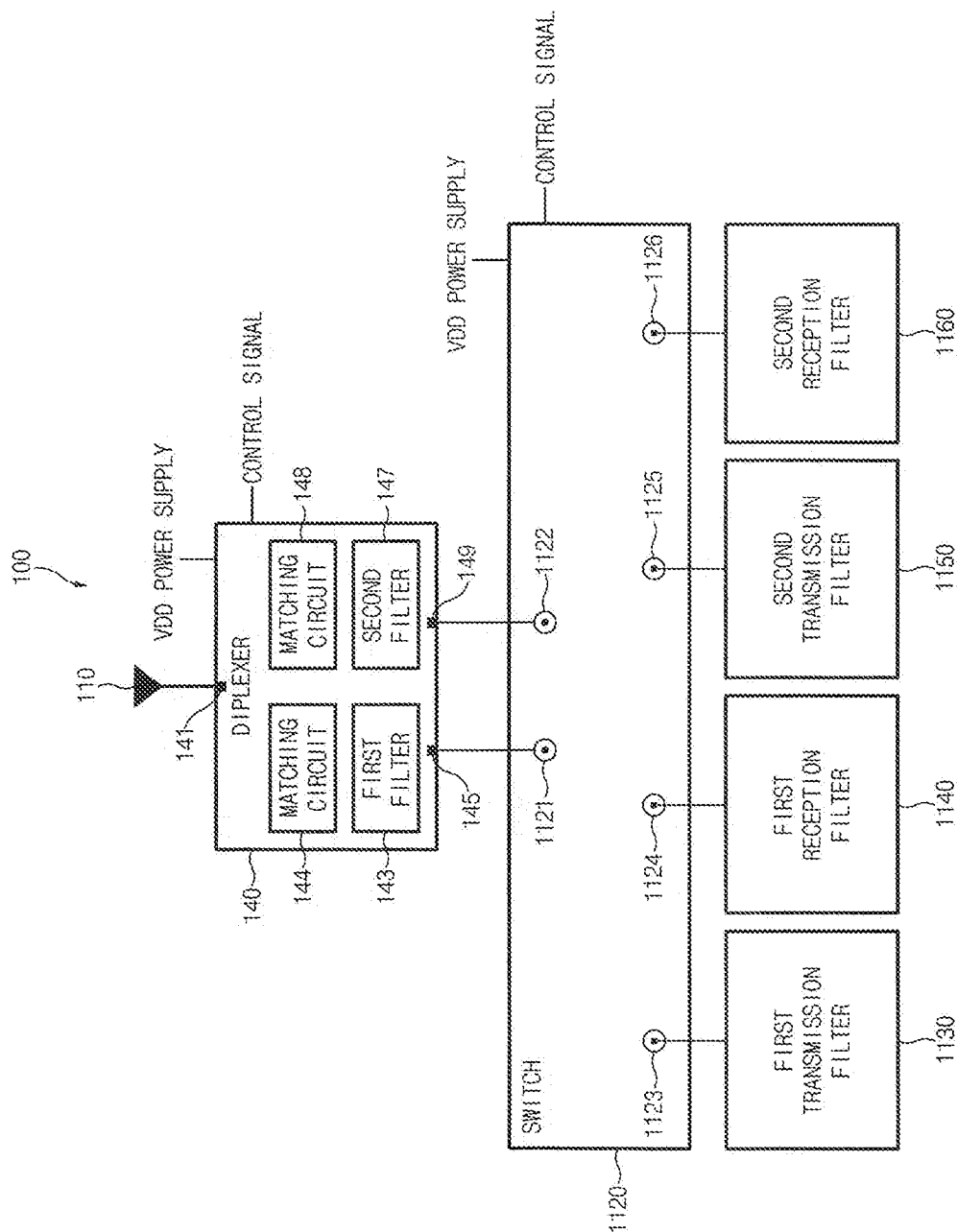
FIG. 11 is a diagram illustrating an electronic device, according to another embodiment.

FIG. 11 is a diagram illustrating the electronic device 100 according to another embodiment. According to another embodiment, the electronic device 100 may include the one or more antennas 110, the diplexer 140, a switch 1120, a first transmission filter 1130, a first reception filter 1140, a second transmission filter 1150, and a second reception filter 1160. The switch 1120 may include first to sixth mapping elements 1121 to 1126. Because configurations and functions of the one or more antennas 110 and the diplexer 140 of the electronic device 100 according to another embodiment are substantially the same as configurations and functions of the one or more antennas 110 and the diplexer 140 of the electronic device 100 according to an embodiment, the descriptions thereof may be omitted.

In an embodiment, the first transmission signal and the first reception signal may be input to the first mapping element 1121 of the switch 1120. The second transmission signal and the second reception signal may be input to the second mapping element 1122 of the switch 1120. The switch 1120 may separate a first transmission signal and a first reception signal from each other. The switch 1120 may separate a second transmission signal and a second reception signal from each other.

In an embodiment, the switch 1120 may selectively connect the first mapping element 1121 to one or more mapping elements among the third to sixth mapping elements 1123 to 1126. The switch 1120 may selectively connect the second mapping element 1122 to one or more mapping elements among the third to sixth mapping elements 1123 to 1126.

In an embodiment, the first transmission filter 1130 may be electrically connected to the third mapping element 1123. The first transmission filter 1130 may pass the first transmission frequency band 211. The first transmission filter 1130 may filter a frequency band other than the first transmission frequency band 211. The first transmission filter 1130 may be implemented as a BPF passing through the first transmission frequency band 211. The first transmission filter 1130 may be implemented with a SAW filter.

In an embodiment, the first reception filter 1140 may be electrically connected to the fourth mapping element 1124. The first reception filter 1140 may pass the first reception frequency band 213. The first reception filter 1140 may filter a frequency band other than the first reception frequency band 213. The first reception filter 1140 may be implemented with a BPF passing the first reception frequency band 213. The first reception filter 1140 may be implemented with a SAW filter.

In an embodiment, the second transmission filter 1150 may be electrically connected to the fifth mapping element 1125. The second transmission filter 1150 may pass the second transmission frequency band 221. The second transmission filter 1150 may filter a frequency band other than the second transmission frequency band 221. The second transmission filter 1150 may be implemented with a BPF passing the second transmission frequency band 221. The second transmission filter 1150 may be implemented with a SAW filter.

In an embodiment, the second reception filter 1160 may be electrically connected to the sixth mapping element 1126. The second reception filter 1160 may pass the second reception frequency band 223. The second reception filter 1160 may filter a frequency band other than the second reception frequency band 223. The second reception filter 1160 may be implemented with a BPF passing the second reception frequency band 223. The second reception filter 1160 may be implemented with a SAW filter.

In an embodiment, the switch 1120 may obtain a voltage (e.g., VDD voltage) generated by a power supply unit (e.g., the power management module 1588 of FIG. 15). The switch 1120 may obtain a control signal generated by a processor (e.g., the processor 1520 of FIG. 15). The processor may be operatively connected to the switch 1120.

Figure 12:
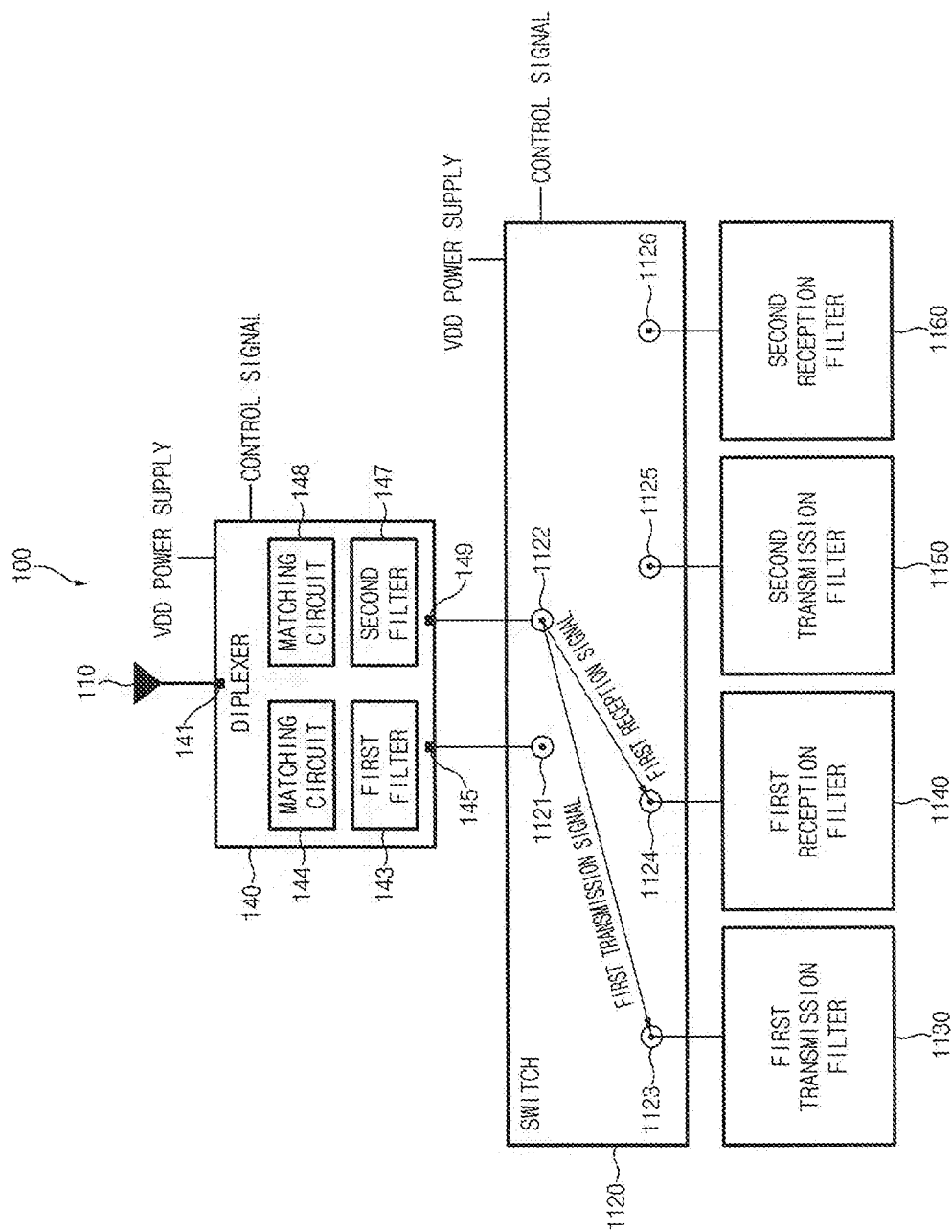
FIG. 12 is a diagram in a case where an electronic device uses a first frequency band, according to another embodiment.

FIG. 12 is a diagram in a case where the electronic device 100 uses the first frequency band 210, according to another embodiment.

In an embodiment, when the electronic device 100 uses the first frequency band 210, the diplexer 140 of the electronic device 100 may adjust the cut-off frequency 410 to be lower than the first reception frequency band 213. The first transmission signal and the first reception signal may be delivered to the switch 1120 through the third terminal 149 of the diplexer 140.

In an embodiment, the switch 1120 may electrically connect the second mapping element 1122 and the third mapping element 1123. The switch 1120 may electrically connect the second mapping element 1122 and the fourth mapping element 1124. The switch 1120 may electrically isolate the first mapping element 1121, the fifth mapping element 1125, and the sixth mapping element 1126.

In an embodiment, the switch 1120 may directly map the first transmission signal from the second mapping element 1122 to the third mapping element 1123. The switch 1120 may directly map the first reception signal from the second mapping element 1122 to the fourth mapping element 1124. The switch 1120 may connect the first filter 143 to the third mapping element 1123. The switch 1120 may connect the first filter 143 to the fourth mapping element 1124.

In an embodiment, the switch 1120 may connect the first filter 143 to the first transmission filter 1130 to deliver a first transmission signal to the first transmission filter 1130. The switch 1120 may connect the first filter 143 to the first reception filter 1140 to transmit a first reception signal to the first reception filter 1140.

Figure 13:
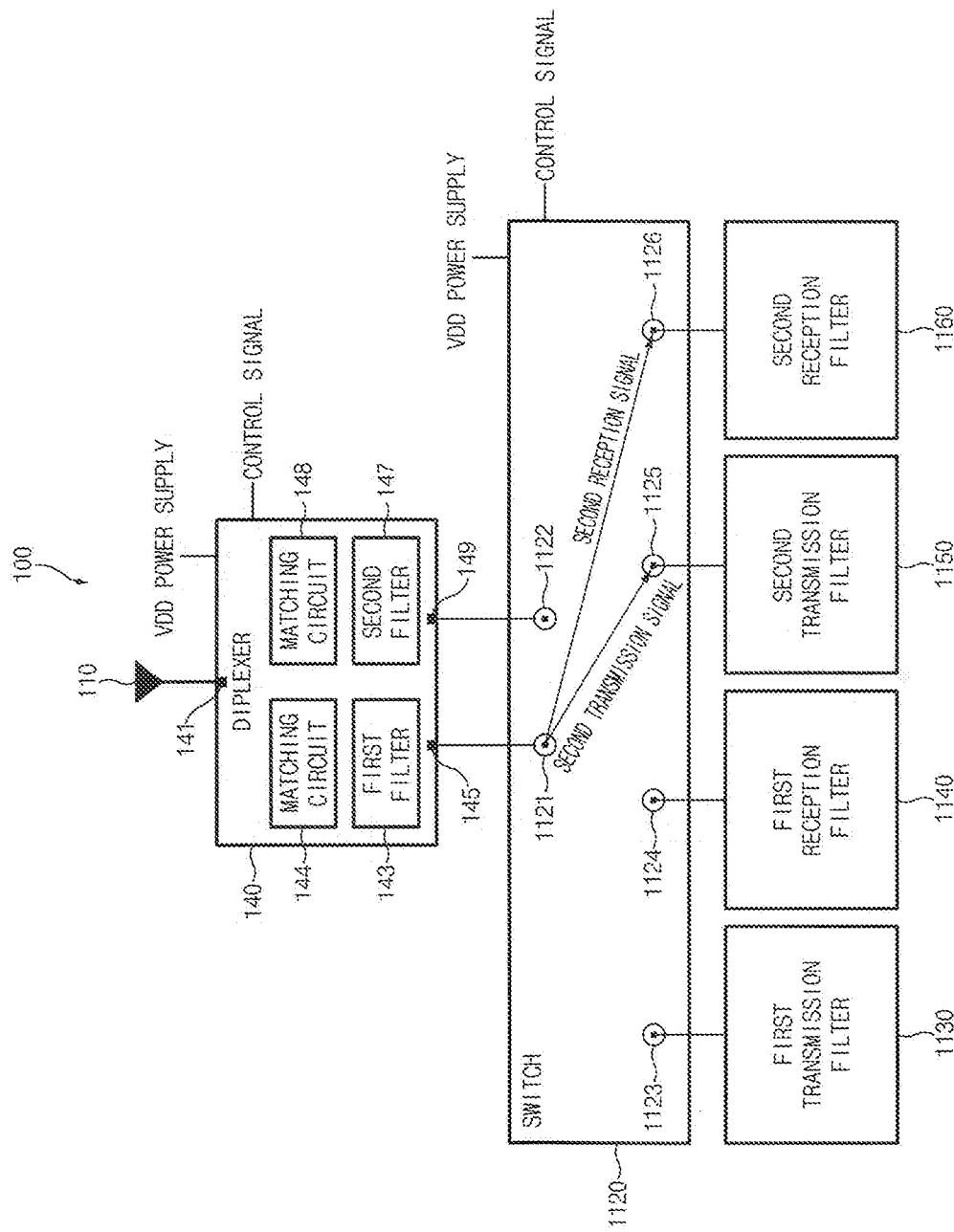
FIG. 13 is a diagram in a case where an electronic device uses a second frequency band, according to another embodiment.

FIG. 13 is a diagram in a case where the electronic device 100 uses the second frequency band 220, according to another embodiment.

In an embodiment, when the second frequency band 220 is used, the diplexer 140 of the electronic device 100 may adjust the cut-off frequency 610 higher than the second reception frequency band 223. The second transmission signal and the second reception signal may be delivered to the switch 1120 through the second terminal 145 of the diplexer 140.

In an embodiment, the switch 1120 may electrically connect the first mapping element 1121 to the fifth mapping element 1125. The switch 1120 may electrically connect the first mapping element 1121 to the sixth mapping element 1126. The switch 1120 may electrically isolate the second mapping element 1122, the third mapping element 1123, and the fourth mapping element 1124.

In an embodiment, the switch 1120 may directly map the second transmission signal from the first mapping element 1121 to the fifth mapping element 1125. The switch 1120 may directly map the second reception signal from the first mapping element 1121 to the sixth mapping element 1126. The switch 1120 may connect the second filter 147 to the fifth mapping element 1125. The switch 1120 may connect the second filter 147 to the sixth mapping element 1126.

In an embodiment, the switch 1120 may connect the second filter 147 to the second transmission filter 1150 to transmit a second transmission signal to the second transmission filter 1150. The switch 1120 may connect the second filter 147 to the second reception filter 1160 to deliver a second reception signal to the second reception filter 1160.

Figure 14:
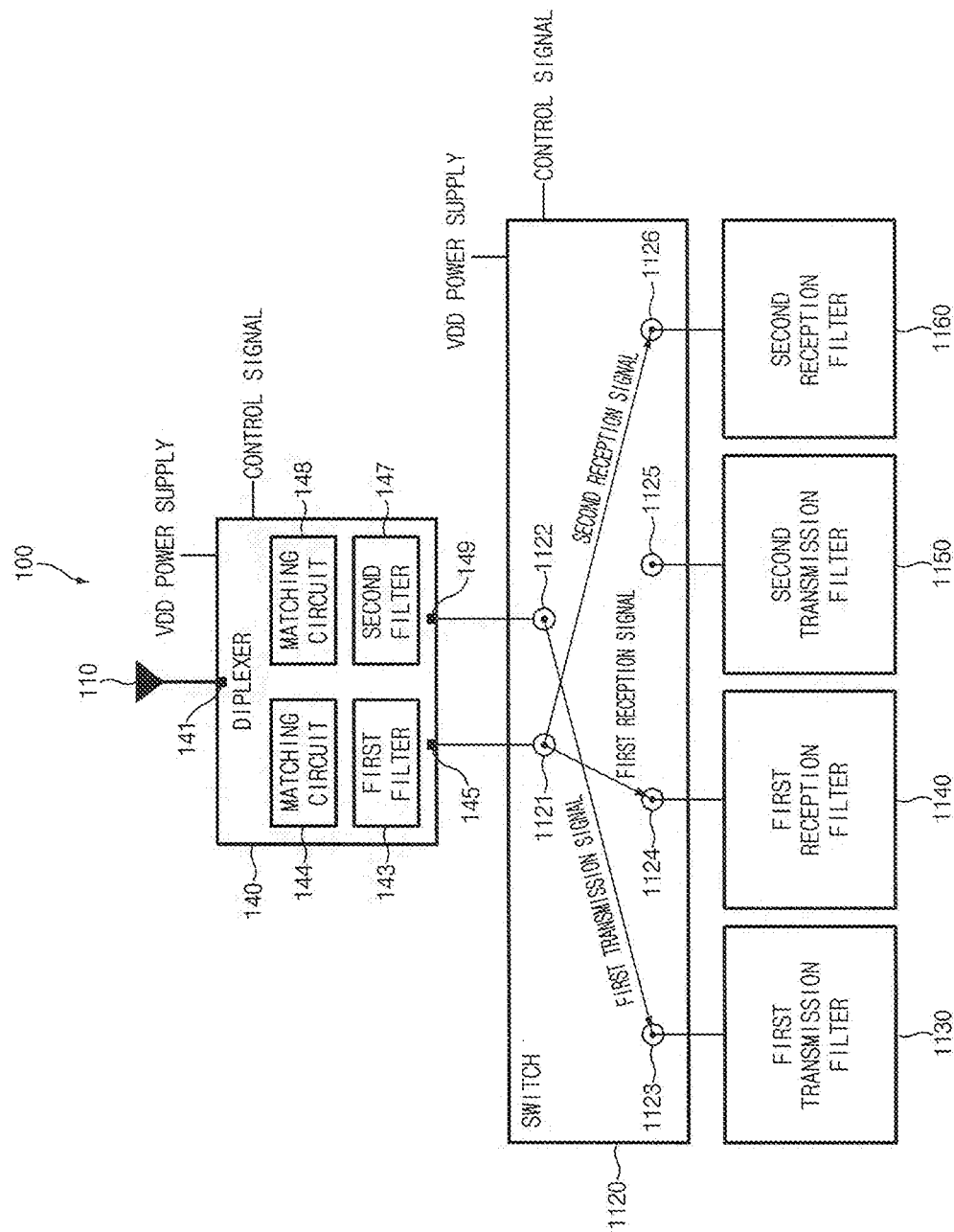
FIG. 14 is a diagram in a case where an electronic device operates in a CA mode using a first frequency band and a second frequency band, according to another embodiment.

FIG. 14 is a diagram in a case where the electronic device 100 operates in a CA mode using the first frequency band 210 and the second frequency band, according to another embodiment.

In an embodiment, when the first frequency band 210 and the second frequency band 220 are used, the diplexer 140 of the electronic device 100 may adjust the cut-off frequency 810 to be higher than the first reception frequency band 213. The first reception signal and the second reception signal may be delivered to the switch 1120 through the second terminal 145 of the diplexer 140. The first transmission signal may be delivered to the switch 1120 through the third terminal 149 of the diplexer 140.

In an embodiment, the switch 1120 may electrically connect the first mapping element 1121 to the fourth mapping element 1124. The switch 1120 may electrically connect the first mapping element 1121 to the sixth mapping element 1126. The switch 1120 may electrically connect the second mapping element 1122 and the third mapping element 1123. The switch 1120 may electrically isolate the fifth mapping element 1125.

In an embodiment, the switch 1120 may directly map the first reception signal from the first mapping element 1121 to the fourth mapping element 1124. The switch 1120 may directly map the second reception signal from the first mapping element 1121 to the sixth mapping element 1126. The switch 1120 may directly map the first transmission signal from the second mapping element 1122 to the third mapping element 1123.

In an embodiment, the switch 1120 may connect the first filter 143 to the third mapping element 1123. The switch 1120 may connect the second filter 147 to the fourth mapping element 1124. The switch 1120 may connect the second filter 147 to the sixth mapping element 1126. The switch 1120 may connect the second filter 147 to the first transmission filter 1130 to deliver a first transmission signal to the first transmission filter 1130. The switch 1120 may connect the second filter 147 to the first reception filter 1140 to deliver a first reception signal to the first reception filter 1140. The switch 1120 may connect the second filter 147 to the second reception filter 1160 to deliver a second reception signal to the second reception filter 1160.

The electronic device 100 according to another embodiment may replace the first duplexer 120 and the second duplexer 130 of the electronic device 100 according to an embodiment, using the switch 1120, the first transmission filter 1130, the first reception filter 1140, the second transmission filter 1150, and the second reception filter 1160.

FIG. 15 is a block diagram illustrating an electronic device 1501 in a network environment 1500 according to various embodiments. Referring to FIG. 15, the electronic device 1501 in the network environment 1500 may communicate with an electronic device 1502 via a first network 1598 (e.g., a short-range wireless communication network), or an electronic device 1504 or a server 1508 via a second network 1599 (e.g., a long-range wireless communication network). According to an embodiment, the electronic device 1501 may communicate with the electronic device 1504 via the server 1508. According to an embodiment, the electronic device 1501 may include a processor 1520, memory 1530, an input device 1550, a sound output device 1555, a display device 1560, an audio module 1570, a sensor module 1576, an interface 1577, a haptic module 1579, a camera module 1580, a power management module 1588, a battery 1589, a communication module 1590, a subscriber identification module (SIM) 1596, or an antenna module 1597. In some embodiments, at least one (e.g., the display device 1560 or the camera module 1580) of the components may be omitted from the electronic device 1501, or one or more other components may be added in the electronic device 1501. In some embodiments, some of the components may be implemented as single integrated circuitry. For example, the sensor module 1576 (e.g., a fingerprint sensor, an iris sensor, or an illuminance sensor) may be implemented as embedded in the display device 1560 (e.g., a display).

The processor 1520 may execute, for example, software (e.g., a program 1540) to control at least one other component (e.g., a hardware or software component) of the electronic device 1501 coupled with the processor 1520, and may perform various data processing or computation. According to one embodiment, as at least part of the data processing or computation, the processor 1520 may load a command or data received from another component (e.g., the sensor module 1576 or the communication module 1590) in volatile memory 1532, process the command or the data stored in the volatile memory 1532, and store resulting data in non-volatile memory 1534. According to an embodiment, the processor 1520 may include a main processor 1521 (e.g., a central processing unit (CPU) or an application processor (AP)), and an auxiliary processor 1523 (e.g., a graphics processing unit (GPU), an image signal processor (ISP), a sensor hub processor, or a communication processor (CP)) that is operable independently from, or in conjunction with, the main processor 1521. Additionally or alternatively, the auxiliary processor 1523 may be adapted to consume less power than the main processor 1521, or to be specific to a specified function. The auxiliary processor 1523 may be implemented as separate from, or as part of the main processor 1521.

The auxiliary processor 1523 may control at least some of functions or states related to at least one component (e.g., the display device 1560, the sensor module 1576, or the communication module 1590) among the components of the electronic device 1501, instead of the main processor 1521 while the main processor 1521 is in an inactive (e.g., sleep) state, or together with the main processor 1521 while the main processor 1521 is in an active state (e.g., executing an application). According to an embodiment, the auxiliary processor 1523 (e.g., an image signal processor or a communication processor) may be implemented as part of another component (e.g., the camera module 1580 or the communication module 1590) functionally related to the auxiliary processor 1523.

The memory 1530 may store various data used by at least one component (e.g., the processor 1520 or the sensor module 1576) of the electronic device 1501. The various data may include, for example, software (e.g., the program 1540) and input data or output data for a command related thereto. The memory 1530 may include the volatile memory 1532 or the non-volatile memory 1534.

The program 1540 may be stored in the memory 1530 as software, and may include, for example, an operating system (OS) 1542, middleware 1544, or an application 1546.

The input device 1550 may receive a command or data to be used by other component (e.g., the processor 1520) of the electronic device 1501, from the outside (e.g., a user) of the electronic device 1501. The input device 1550 may include, for example, a microphone, a mouse, or a keyboard.

The sound output device 1555 may output sound signals to the outside of the electronic device 1501. The sound output device 1555 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1560 may visually provide information to the outside (e.g., a user) of the electronic device 1501. The display device 1560 may include, for example, a display, a hologram device, or a projector and control circuitry to control a corresponding one of the display, hologram device, and projector. According to an embodiment, the display device 1560 may include touch circuitry adapted to detect a touch, or sensor circuitry (e.g., a pressure sensor) adapted to measure the intensity of force incurred by the touch.

The audio module 1570 may convert a sound into an electrical signal and vice versa. According to an embodiment, the audio module 1570 may obtain the sound via the input device 1550, or output the sound via the sound output device 1555 or a headphone of an external electronic device (e.g., an electronic device 1502) directly (e.g., wiredly) or wirelessly coupled with the electronic device 1501.

The sensor module 1576 may detect an operational state (e.g., power or temperature) of the electronic device 1501 or an environmental state (e.g., a state of a user) external to the electronic device 1501, and then generate an electrical signal or data value corresponding to the detected state. According to an embodiment, the sensor module 1576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1577 may support one or more specified protocols to be used for the electronic device 1501 to be coupled with the external electronic device (e.g., the electronic device 1502) directly (e.g., wiredly) or wirelessly. According to an embodiment, the interface 1577 may include, for example, a high definition multimedia interface (HDMI), a universal serial bus (USB) interface, a secure digital (SD) card interface, or an audio interface.

A connecting terminal 1578 may include a connector via which the electronic device 1501 may be physically connected with the external electronic device (e.g., the electronic device 1502). According to an embodiment, the connecting terminal 1578 may include, for example, a HDMI connector, a USB connector, a SD card connector, or an audio connector (e.g., a headphone connector), The haptic module 1579 may convert an electrical signal into a mechanical stimulus (e.g., a vibration or a movement) or electrical stimulus which may be recognized by a user via his tactile sensation or kinesthetic sensation. According to an embodiment, the haptic module 1579 may include, for example, a motor, a piezoelectric element, or an electric stimulator.

The camera module 1580 may capture a still image or moving images. According to an embodiment, the camera module 1580 may include one or more lenses, image sensors, image signal processors, or flashes.

The power management module 1588 may manage power supplied to the electronic device 1501. According to one embodiment, the power management module 1588 may be implemented as at least part of, for example, a power management integrated circuit (PMIC).

The battery 1589 may supply power to at least one component of the electronic device 1501. According to an embodiment, the battery 1589 may include, for example, a primary cell which is not rechargeable, a secondary cell which is rechargeable, or a fuel cell.

The communication module 1590 may support establishing a direct (e.g., wired) communication channel or a wireless communication channel between the electronic device 1501 and the external electronic device (e.g., the electronic device 1502, the electronic device 1504, or the server 1508) and performing communication via the established communication channel. The communication module 1590 may include one or more communication processors that are operable independently from the processor 1520 (e.g., the application processor (AP)) and supports a direct (e.g., wired) communication or a wireless communication. According to an embodiment, the communication module 1590 may include a wireless communication module 1592 (e.g., a cellular communication module, a short-range wireless communication module, or a global navigation satellite system (GNSS) communication module) or a wired communication module 1594 (e.g., a local area network (LAN) communication module or a power line communication (PLC) module). A corresponding one of these communication modules may communicate with the external electronic device via the first network 1598 (e.g., a short-range communication network, such as Bluetooth™, wireless-fidelity (Wi-Fi) direct, or infrared data association (IrDA)) or the second network 1599 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1592 may identify and authenticate the electronic device 1501 in a communication network, such as the first network 1598 or the second network 1599, using subscriber information (e.g., international mobile subscriber identity (IMSI)) stored in the subscriber identification module 1596.

The antenna module 1597 may transmit or receive a signal or power to or from the outside (e.g., the external electronic device) of the electronic device 1501. According to an embodiment, the antenna module 1597 may include one or more antennas, and, therefrom, at least one antenna appropriate for a communication scheme used in the communication network, such as the first network 1598 or the second network 1599, may be selected, for example, by the communication module 1590 (e.g., the wireless communication module 1592). The signal or the power may then be transmitted or received between the communication module 1590 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1501 and the external electronic device 1504 via the server 1508 coupled with the second network 1599. Each of the electronic devices 1502 and 1504 may be a device of a same type as, or a different type, from the electronic device 1501. According to an embodiment, all or some of operations to be executed at the electronic device 1501 may be executed at one or more of the external electronic devices 1502, 1504, or 1508. For example, if the electronic device 1501 should perform a function or a service automatically, or in response to a request from a user or another device, the electronic device 1501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1501. The electronic device 1501 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1540) including one or more instructions that are stored in a storage medium (e.g., internal memory 1536 or external memory 1538) that is readable by a machine (e.g., the electronic device 1501). For example, a processor (e.g., the processor 1520) of the machine (e.g., the electronic device 1501) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
   an antenna configured to transmit or receive a signal in a first frequency band and a second frequency band wirelessly;
   a first duplexer configured to separate the first frequency band into a first transmission frequency band and a first reception frequency band and to adjust the first reception frequency band;
   a second duplexer configured to separate the second frequency band into a second transmission frequency band and a second reception frequency band and to adjust the second reception frequency band; and
   a diplexer including a first terminal electrically connected to the antenna, a first filter configured to pass the first frequency band, a second terminal electrically connected to the first filter and the first duplexer, a second filter configured to pass the second frequency band, and a third terminal electrically connected to the second filter and the second duplexer,
   wherein the diplexer adjusts a cut-off frequency of the first filter or the second filter in connection with the first reception frequency band adjusted through the first duplexer or the second reception frequency band adjusted through the second duplexer,
   wherein the first duplexer is configured to tune the first reception frequency band by changing a pass band of a first filter in the first duplexer using a first matching circuit in the first duplexer,
   wherein the second duplexer is configured to tune the second reception frequency band by changing a pass band of a second filter in the second duplexer using a second matching circuit in the second duplexer, and
   wherein the diplexer is configured to tune the cut-off frequency by changing frequency characterisitics of a plurality of filters in the diplexer using a plurality of matching circuits in the second duplexer.

2. The electronic device of claim 1, wherein the first reception frequency band at least partly overlaps with the second reception frequency band, and
   wherein the diplexer adjusts the cut-off frequency to a value between the first transmission frequency band and the second transmission frequency band.

3. The electronic device of claim 1, wherein the first reception frequency band at least partly overlaps with the second reception frequency band, and
   wherein the first duplexer reduces a width of the first reception frequency band when the first reception frequency band is not used.

4. The electronic device of claim 1, wherein the first reception frequency band at least partly overlaps with the second reception frequency band, and
   wherein the second duplexer reduces a width of the second reception frequency band when the second reception frequency band is not used.

5. The electronic device of claim 1, wherein, when the first reception frequency band is used as a single carrier, the diplexer adjusts the cut-off frequency to be lower than the first reception frequency band, and the first duplexer reduces a width of the first reception frequency band.

6. The electronic device of claim 1, wherein, when the second reception frequency band is used as a single carrier, the diplexer adjusts the cut-off frequency to be higher than the second reception frequency band, and the second duplexer reduces a width of the second reception frequency band.

7. The electronic device of claim 1, wherein, when the first reception frequency band and the second reception frequency band are used by applying carrier aggregation (CA), the diplexer adjusts the cut-off frequency to be higher than the first reception frequency band, and the second duplexer simultaneously provides a radio frequency integrated circuit (RFIC) with the first reception frequency band and the second reception frequency band.

8. The electronic device of claim 1, further comprising:
   a splitter electrically connected to the second duplexer.

9. The electronic device of claim 1, further comprising:
   a front end module configured to supply at least one of a signal having the first frequency band and a signal having the second frequency band to the diplexer.

10. The electronic device of claim 1, further comprising:
    a modem configured to determine whether to use the first frequency band and the second frequency band and to control the diplexer to set the cut-off frequency.

11. The electronic device of claim 1, further comprising:
    a first amplifier configured to obtain a transmission signal having the first transmission frequency band and the second transmission frequency band from an RFIC and to amplify and provide the transmission signal to the diplexer; and
    a second amplifier configured to obtain a reception signal having the first reception frequency band and the second reception frequency band from the first duplexer and the second duplexer and to amplify and provide the reception signal to the RFIC.

12. An electronic device comprising:
    one or more antennas configured to transmit or receive a signal in a first frequency band and a second frequency band wirelessly;
    a first duplexer configured to separate the first frequency band into a first transmission frequency band and a first reception frequency band and to adjust the first reception frequency band;
    a second duplexer configured to separate the second frequency band into a second transmission frequency band and a second reception frequency band and to adjust the second reception frequency band; and
    a diplexer including a first terminal electrically connected to the one or more antennas, a first filter configured to pass the first frequency band, a second terminal electrically connected to the first filter and the first duplexer, a second filter configured to pass the second frequency band, and a third terminal electrically connected to the second filter and the second duplexer, and configured to adjust a cut-off frequency of the first filter or the second filter depending on whether to use the first reception frequency band and the second reception frequency band; and a processor operatively connected to the first duplexer, the second duplexer, and the diplexer, wherein the processor is configured to:
- in a case of a first mode, adjust the cut-off frequency to be higher than the first reception frequency band;
- in a case of a second mode, adjust the cut-off frequency to be lower than the first reception frequency band, and adjust the second reception frequency band to a frequency band lower than the adjusted cut-off frequency through the second duplexer; and
- in a case of a third mode, adjust the cut-off frequency to be higher than the second reception frequency band, and adjust the first reception frequency band to a frequency band higher than the adjusted cut-off frequency through the first duplexer, wherein the first duplexer is configured to tune the first reception frequency band by changing a pass band of a first filter in the first duplexer using a first matching circuit in the first duplexer, wherein the second duplexer is configured to tune the second reception frequency band by changing a pass band of a second filter in the second duplexer using a second matching circuit in the second duplexer, and wherein the diplexer is configured to tune the cut-off frequency by changing frequency characterisitics of a plurality of filters in the diplexer using a plurality of matching circuits in the second duplexer.

13. The electronic device of claim 12, wherein the first reception frequency band partly overlaps with the second reception frequency band, and wherein the diplexer is set to the first mode, the second mode, or the third mode depending on mode information received from a modem.

14. The electronic device of claim 12, wherein the first reception frequency band partly overlaps with the second reception frequency band, and wherein the second duplexer receives and outputs the first reception frequency band and the second reception frequency band in the first mode, together, and separates the first reception frequency band and the second reception frequency band, using a splitter electrically connected to an output terminal of the second duplexer.

15. The electronic device of claim 12, wherein the first reception frequency band partly overlaps with the second reception frequency band, and wherein the processor is configured to:
- in the second mode, adjust a maximum value of the second reception frequency band to be lower than the cut-off frequency through the second duplexer to reduce a width of the second reception frequency band; and
- in the third mode, adjust a minimum value of the first reception frequency band to be higher than the cut-off frequency through the first duplexer to reduce a width of the first reception frequency band.

* * * * *